US012377658B2

(12) United States Patent
Mizutani et al.

(10) Patent No.: US 12,377,658 B2
(45) Date of Patent: Aug. 5, 2025

(54) CAP AND CARTRIDGE UNIT

(71) Applicant: SEIKO EPSON CORPORATION, Tokyo (JP)

(72) Inventors: Tadahiro Mizutani, Shiojiri (JP); Yoshihiro Koizumi, Shiojiri (JP); Shun Oya, Kiso-machi (JP); Takumi Nagashima, Matsumoto (JP); Hiroto Hanba, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 166 days.

(21) Appl. No.: 18/237,768

(22) Filed: Aug. 24, 2023

(65) Prior Publication Data

US 2024/0066881 A1 Feb. 29, 2024

(30) Foreign Application Priority Data

Aug. 25, 2022 (JP) ................................ 2022-133883

(51) Int. Cl.
*B41J 2/175* (2006.01)

(52) U.S. Cl.
CPC ....... *B41J 2/17553* (2013.01); *B41J 2/17559* (2013.01)

(58) Field of Classification Search
CPC .... B41J 2/17553; B41J 2/17559; B41J 2/175; B41J 2/1752; B41J 2/17523; B41J 2/1753
USPC ........................................................... 347/86
See application file for complete search history.

(56) References Cited

U.S. PATENT DOCUMENTS 9,061,512 B2 6/2015 Nozawa et al.
2005/0249538 A1 * 11/2005 Patel .................... B43K 23/008 401/126

FOREIGN PATENT DOCUMENTS

JP 2014-097577 A 5/2014

* cited by examiner

*Primary Examiner* — Jason S Uhlenhake
*Assistant Examiner* — Alexander D Shenderov
(74) *Attorney, Agent, or Firm* — Oliff PLC

(57) ABSTRACT

A cartridge including a first guide rib and a second guide rib that extend in the Y direction and project outward in the X direction. In an attachment state in which a cap is attached to the cartridge, the cap includes a sealing wall having a liquid holding portion that faces the liquid supply portion, a first projecting rib projecting in a direction opposite to a projecting direction of the first guide rib, a second projecting rib projecting in a direction opposite to a projecting direction of the second guide rib, a first recessed portion that is formed between the sealing wall and the first projecting rib and accommodates the first guide rib, and a second recessed portion that is formed between the sealing wall and the second projecting rib and accommodates the second guide rib.

4 Claims, 19 Drawing Sheets

CAP AND CARTRIDGE UNIT

The present application is based on, and claims priority from JP Application Serial Number 2022-133883, filed Aug. 25, 2022, the disclosure of which is hereby incorporated by reference herein in its entirety.

BACKGROUND

1. Technical Field

The present disclosure relates to a technique of a cap and a cartridge unit.

2. Related Art

A technique related to a cap that is detachably attached to a liquid supply portion of a cartridge has been known (JP-A-2014-97577).

In the technique of the related art, when the cartridge receives an external shock by falling or the like, the cap may come off the cartridge. Therefore, the present disclosure provides a technique for reducing the possibility of coming off of a cap attached to a cartridge from the cartridge.

SUMMARY

1. According to an aspect of the present disclosure, a cap is provided. The cap is configured to be attached to or detached from a cartridge having a liquid supply portion. When a Z direction is a direction that extends along the liquid supply portion, a Y direction is a longitudinal direction of the cap that intersects the Z direction, and an X direction is a lateral direction of the cap that intersects the Y direction and the Z direction, in an attachment state in which the cap is attached to the cartridge including a first guide rib and a second guide rib that extend in the Y direction and project outward in the X direction, the cap includes a sealing wall having a liquid holding portion that faces the liquid supply portion, a first projecting rib projecting in a direction opposite to a projecting direction of the first guide rib, a second projecting rib projecting in a direction opposite to a projecting direction of the second guide rib, a first recessed portion that is formed between the sealing wall and the first projecting rib and accommodates the first guide rib, and a second recessed portion that is formed between the sealing wall and the second projecting rib and accommodates the second guide rib.

2. According to another aspect of the present disclosure, a cartridge unit is provided. The cartridge unit includes a cartridge having a liquid supply portion, and the cap described in the above-described aspect and attached to the cartridge.

DESCRIPTION OF EMBODIMENTS

A. First Embodiment

A-1. Configuration of Printing Device

Figure 1:
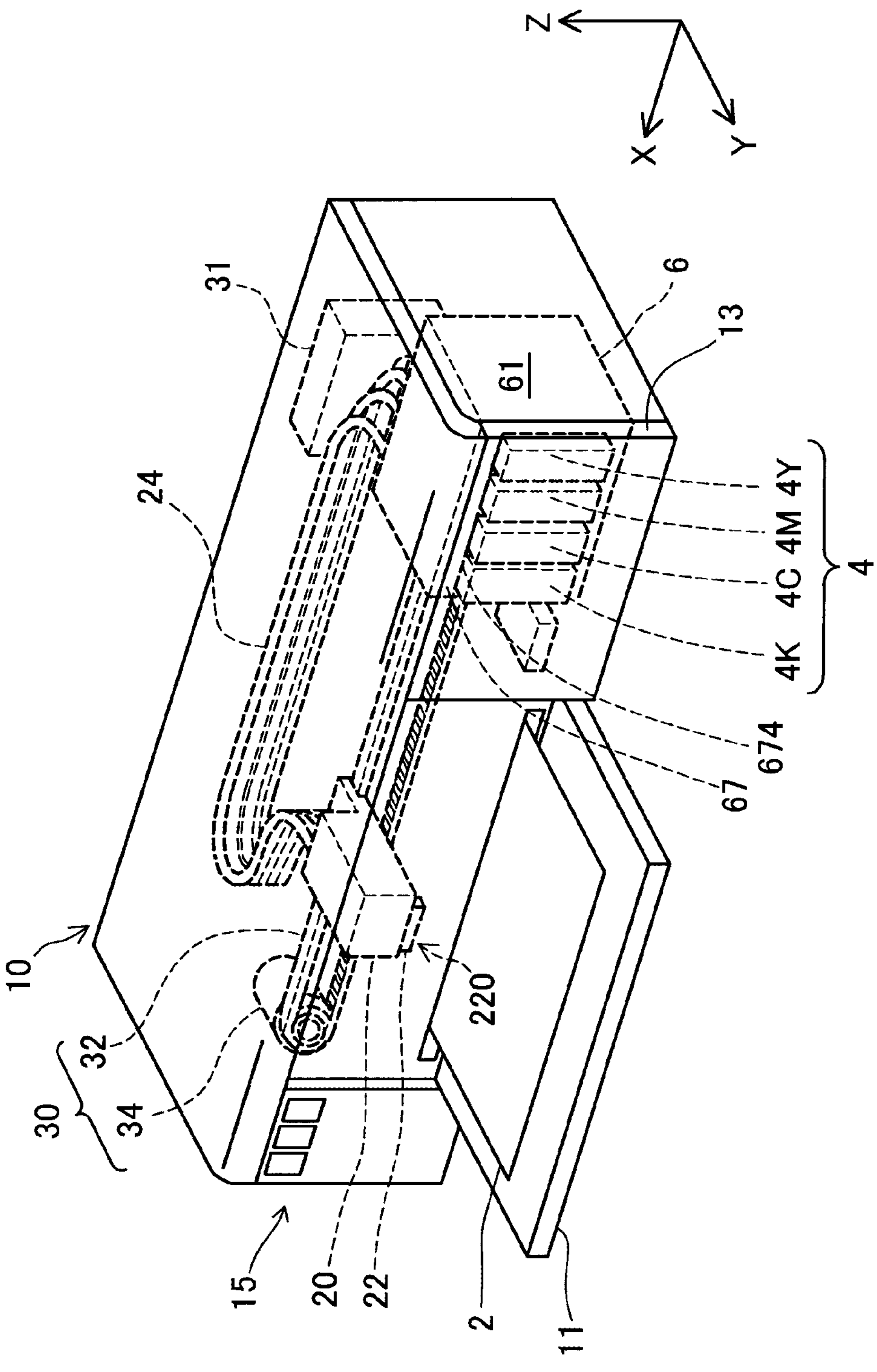
FIG. 1 is a perspective view illustrating a schematic configuration of a printing system.

FIG. 1 is a perspective view illustrating a schematic configuration of a printing system 1. In FIG. 1, X, Y, and Z axes that are three spatial axes orthogonal to each other are illustrated. Directions in which arrows of the X axis, the Y axis, and the Z axis direct indicate positive directions along the X axis, the Y axis, and the Z axis, respectively. The positive directions along the X axis, the Y axis, and the Z axis are a +X direction, a +Y direction, and a +Z direction, respectively. Directions reverse to the directions in which the arrows of the X axis, the Y axis, and the Z axis direct are negative directions along the X axis, the Y axis, and the Z axis, respectively. The negative directions along the X axis, the Y axis, and the Z axis are a −X direction, a −Y direction, and a −Z direction, respectively. Directions along the X axis, the Y axis, and the Z axis regardless of whether being positive or negative are called an X direction, a Y direction, and a Z direction, respectively.

In the present embodiment, in a use state of the printing system 1, the X axis and the Y axis are axes along a horizontal surface, and the Z axis is an axis along the direction of gravity. Hereinafter, the direction of gravity is the −Z axis, and a direction opposite to the direction of gravity is the +Z direction. A direction directed to a rear surface side from a front surface side of the printing system 1 is the −Y direction, and a direction directed to the front surface side from the rear surface side is the +Y direction. In addition, when the printing system 1 is viewed from the front surface side, a direction directed to the left from the right is the +X direction, and a direction directed to the right from the left is the −X direction. Note that the "use state of the printing system 1" is referred to as a state in which the printing system 1 is installed on a horizontal surface. The same applies to the figures and description described below.

The printing system 1 includes a printing device 10, a cartridge 4 that supplies ink as a liquid to the printing device 10, and a cap 7, described later and illustrated in FIG. 7, that is detachably attached to the cartridge 4.

In the present embodiment, the printing device 10 is an ink jet printer that discharges ink as a liquid from a discharge head 22. The printing device 10 includes a cartridge attachment portion 6, a control unit 31, a carriage 20, the discharge head 22, and a driving mechanism 30. In addition, the printing device 10 includes an operation button 15 with which a user operates operation of the printing device 10.

The cartridge attachment portion 6 has a first device wall 67 located on the +Y direction side. The first device wall 67 has an insertion/removal opening 674, which is an entrance/exit for the cartridge 4 to and from an accommodation chamber 61. The cartridge 4 is accommodated in or removed from the accommodation chamber 61 of the cartridge attachment portion 6 through the insertion/removal opening 674. In the present embodiment, an insertion direction D1 in which the cartridge 4 is inserted into the cartridge attachment portion 6 for attachment is the −Y direction. A removal direction D4 in which the cartridge 4 is removed from the cartridge attachment portion 6 is the +Y direction. Therefore, the −Y direction side of the cartridge attachment portion 6 is also referred to as a back side, and the +Y direction side is also referred to as a front side.

One or more of the cartridges 4 are detachably attached to the cartridge attachment portion 6. In the present embodiment, four kinds of the cartridges 4 corresponding to four colors of ink, which are black, cyan, magenta, and yellow, that is, four cartridges 4 in total are each attached to the cartridge attachment portion 6. A corresponding one of the cartridges 4 that accommodates black ink is also referred to as a first cartridge 4K, and a corresponding one of the cartridges 4 that accommodates cyan ink is also referred to as a second cartridge 4C. In addition, a corresponding one of the cartridges 4 that accommodates magenta ink is also referred to as a third cartridge 4M, and a corresponding one of the cartridges 4 that accommodates yellow ink is also referred to as a fourth cartridge 4Y. In the present embodiment, an arrangement direction of the plurality of cartridges 4K, 4C, 4M, and 4Y is the X direction. Note that the kinds and number of the cartridges 4 that can be accommodated in the accommodation chamber 61 of the cartridge attachment portion 6 is not limited to this configuration.

The printing device 10 has a cover for replacement 13 on the front surface on the +Y direction side. The cover for replacement 13 is configured to be openable and closable. When the cover for replacement 13 is opened, an opening of the cartridge attachment portion 6 appears, and each cartridge 4 can be attached or detached. After the cartridge 4 is attached to the cartridge attachment portion 6, ink is supplied to the discharge head 22 provided in the carriage 20 through a tube 24 as a liquid flow pipe through which the ink flows. Specifically, the ink is supplied to the discharge head 22 by a water head difference between the ink level in the cartridge attachment portion 6 and the discharge head 22. Note that in other embodiments, the ink may be supplied to the discharge head 22 through suction of the ink in the cartridge 4 by a pump mechanism (not illustrated) of the printing device 10.

The discharge head 22 is provided with nozzles 220 for the respective kinds of ink. The discharge head 22 discharges ink from the nozzles 220 toward printing paper 2 so as to perform printing of data such as characters and images. In the present embodiment, the printing device 10 is a so-called "off-carriage type" printer in which the cartridge attachment portion 6 does not interlock with the movement of the carriage 20. On the other hand, the technique of the present disclosure is applicable to a so-called "on-carriage type" printer in which the cartridge attachment portion 6 is provided in the carriage 20 and moves together with the carriage 20.

The control unit 31 controls each portion of the printing device 10 and transmits and receives signals to and from the cartridge 4. The carriage 20 relatively moves the discharge head 22 with respect to the printing paper 2.

The driving mechanism 30 reciprocates the carriage 20 based on a control signal from the control unit 31. The driving mechanism 30 includes a timing belt 32 and a driving motor 34. When the power of the driving motor 34 is transmitted to the carriage 20 through the timing belt 32, the carriage 20 reciprocates in a main scanning direction along the X direction. In addition, the printing device 10 has a transporting mechanism for moving the printing paper 2 in a sub-scanning direction. When printing is performed, the printing paper 2 is moved in the sub-scanning direction, which is the +Y direction, by the transporting mechanism and the printing paper 2 on which printing has been finished is output to a front surface cover 11.

A-2. Detailed Configuration of Cartridge Attachment Portion

Figure 2:
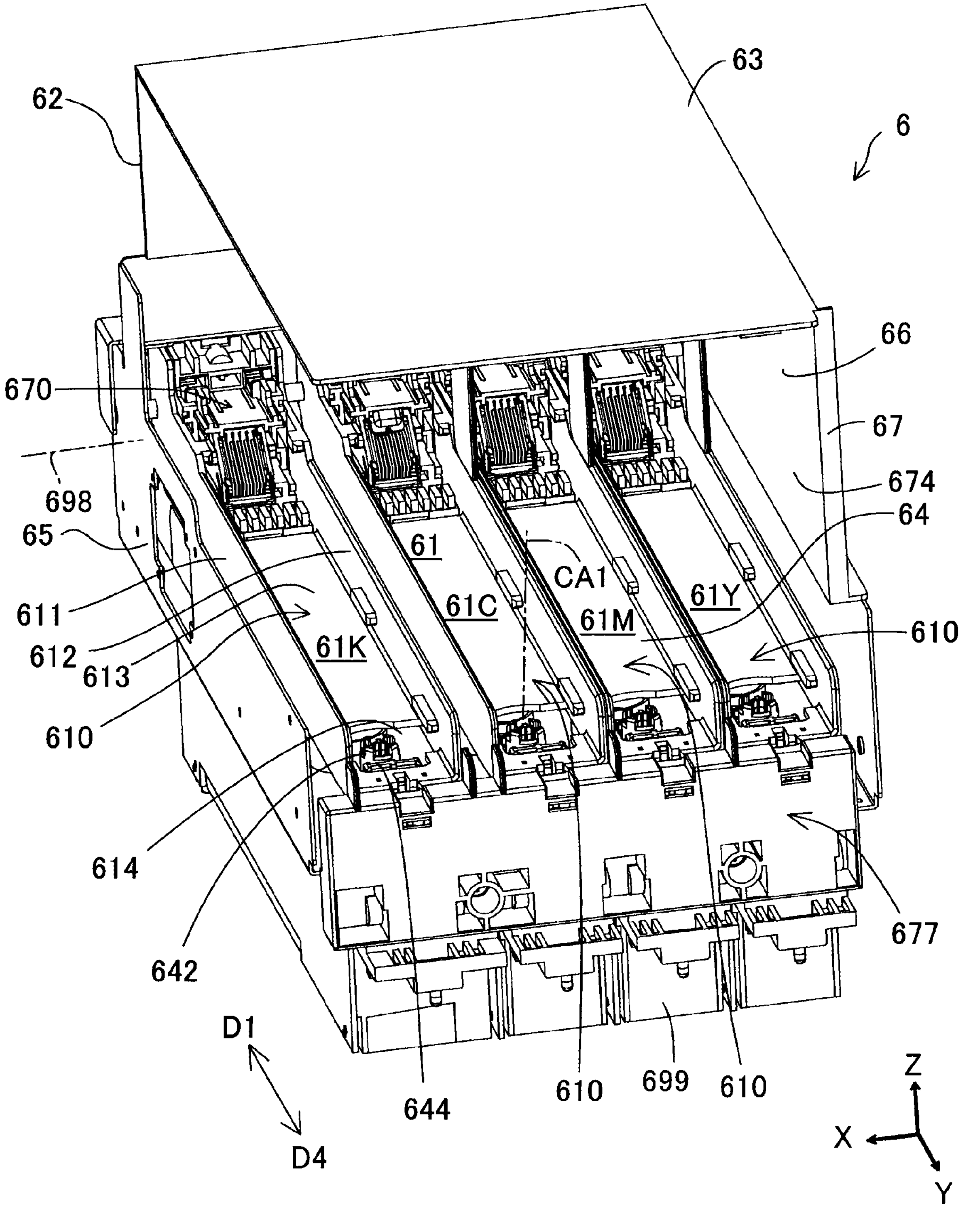
FIG. 2 is a perspective view of a cartridge attachment portion.
Figure 3:
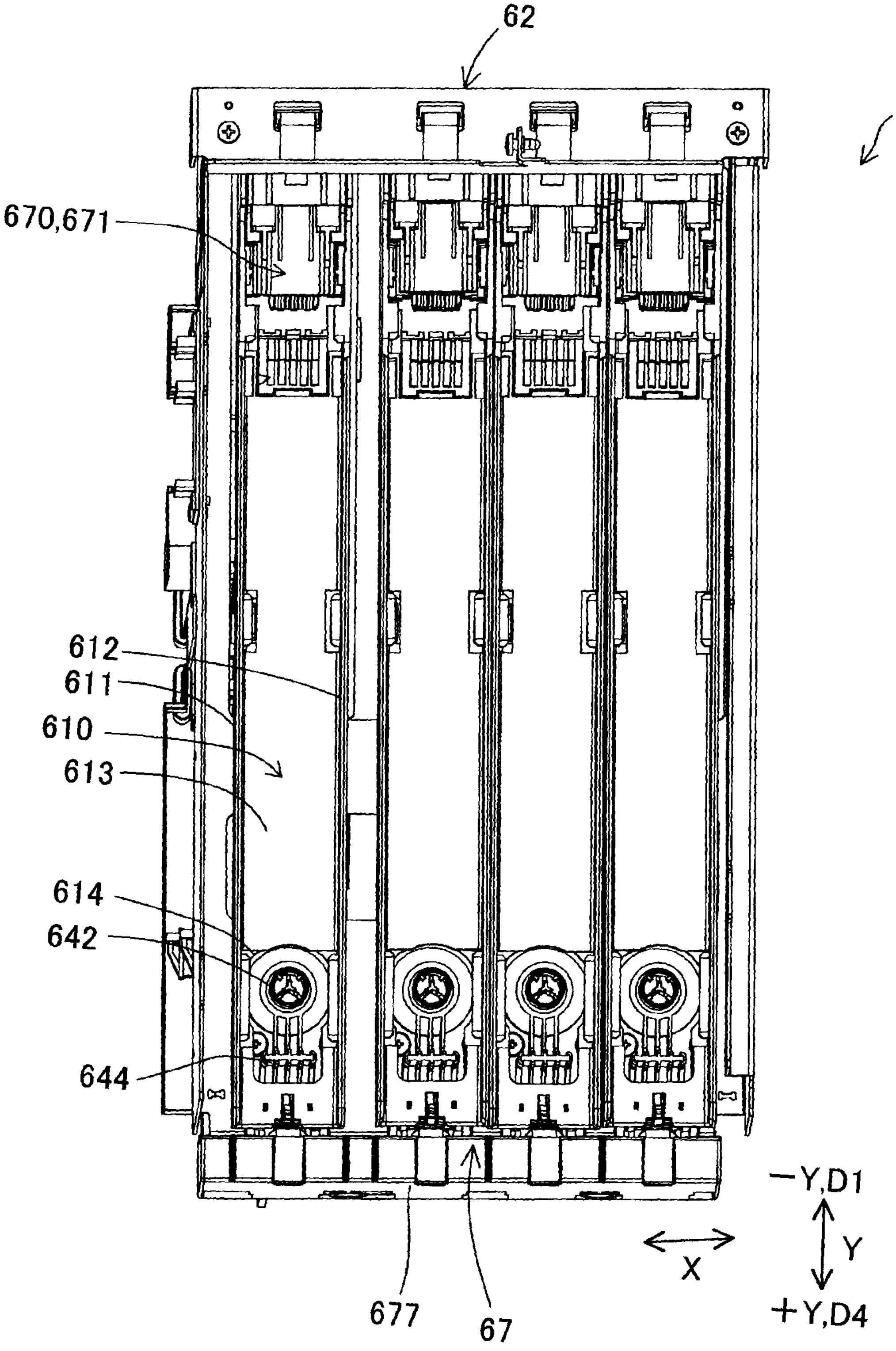
FIG. 3 is a view of the cartridge attachment portion viewed from a +Z direction side.

FIG. 2 is a perspective view of the cartridge attachment portion 6. FIG. 3 is a view of the cartridge attachment portion 6 viewed from the +Z direction side. In FIGS. 2 and 3, for ease of understanding, a part of the configuration of the cartridge attachment portion 6 is not illustrated. With regard to the cartridge attachment portion 6, the X direction, the Y direction, and the Z direction are also referred to as a width direction, a depth direction, and a height direction, respectively. Hereinafter, when the state is not particularly described, each element will be described assuming that the cartridge attachment portion 6 is in an initial arrangement state in which the cartridge 4 is not attached to the cartridge attachment portion 6.

As illustrated in FIG. 2, the cartridge attachment portion 6 has the accommodation chamber 61 in which the cartridge 4 is accommodated. In the present embodiment, the accommodation chamber 61 has a substantially rectangular parallelepiped shape. The shape of each of slots 61K, 61C, 61M, and 61Y, of the accommodation chamber 61, that accommodate the cartridges 4K, 4C, 4M, and 4Y substantially corresponds to the external shape of each of the cartridges 4K, 4C, 4M, and 4Y illustrated in FIG. 1.

The cartridge attachment portion 6 has device walls 62, 63, 64, 65, 66, and 67, which are six device walls forming the accommodation chamber 61. In the present disclosure, a "wall" is a concept including a wall consisting of a plurality of walls, in addition to a single wall. The first device wall 67 forms the insertion/removal opening 674 through which the cartridge 4 passes when being inserted into or removed from the accommodation chamber 61. The second device wall 62 faces the first device wall 67 in the Y direction and forms a wall on the −Y direction side of the accommodation chamber 61. The second device wall 62 is a wall substantially perpendicular to a horizontal surface along the Z direction in the use state of the printing device 10.

The device upper wall 63 forms a wall on the +Z direction side of the accommodation chamber 61. The device bottom wall 64 faces the device upper wall 63 in the Z direction and forms a wall on the −Z direction side of the accommodation chamber 61. The device bottom wall 64 is formed by a support member 610. The device bottom wall 64 has a device opening 614 that is formed for each of the slots 61K, 61C, 61M, and 61Y. In the present embodiment, four device openings 614 are formed corresponding to the slots 61K, 61C, 61M, and 61Y. The device upper wall 63 and the device bottom wall 64 intersect the second device wall 62 and the first device wall 67. In the present disclosure, "intersect" means any one of the following states (i) to (iii). (i) a state in which two elements intersect each other and actually intersect, (ii) a state in which one element intersects the other element when extending, and (iii) a state in which two elements intersect each other when each of the two elements extends.

The first device side wall 65 forms a wall on the +X direction side of the accommodation chamber 61. The second device side wall 66 faces the first device side wall 65 in the X direction and forms a wall on the −X direction side of the accommodation chamber 61. Each of the first device side wall 65 and the second device side wall 66 intersects the second device wall 62, the first device wall 67, the device upper wall 63, and the device bottom wall 64.

As illustrated in FIGS. 2 and 3, the cartridge attachment portion 6 further includes the support member 610, a liquid storage portion 699, a liquid inlet portion 642, a device-side supply portion positioning portion 644, a device-side terminal portion 670, and an engagement formation body 677.

A plurality of support members 610 is provided corresponding to the number of the cartridges 4 to be attached. In the present embodiment, the support members 610 supports the cartridges 4 from the −Z direction side, which is the direction of gravity side. Each of the support members 610 is a member having a recessed shape and extending in the Y direction.

The support member 610 has a main wall 613 that forms the device bottom wall 64, a first support side wall 611, and a second support side wall 612. The main wall 613 forms a bottom portion of the recessed shape and located on the direction of gravity side. Each device opening 614 is formed at an end, of the main wall 613, on the first device wall 67 side located on the +Y direction side. The device opening 614 passes through the main wall 613 in a thickness direction of the main wall 613, which is a direction along the Z direction. The first support side wall 611 is erected on the +X direction side of the main wall 613 in the +Z direction, which is a direction opposite to the direction of gravity. The second support side wall 612 is erected on the −X direction side of the main wall 613 in the +Z direction, which is the direction opposite to the direction of gravity. The first support side wall 611 and the second support side wall 612 face each other in the X direction.

The liquid storage portion 699 receives the liquid of each cartridge 4. The liquid inlet portion 642 has an inlet-portion-side central axis CA1.

As illustrated in FIG. 2, by being received by a cartridge-side supply portion positioning portion 448 of the cartridge 4 illustrated in FIG. 5 and described later, the device-side supply portion positioning portion 644 regulates the movement of a liquid supply portion 442 of the cartridge 4 with respect to the liquid inlet portion 642. The device-side supply portion positioning portion 644 is a projection having a substantially rectangular parallelepiped shape.

The device-side terminal portion 670 is a mechanism provided to electrically couple the cartridge 4 to the printing device 10 in a state in which the cartridge 4 is attached to the cartridge attachment portion 6. The device-side terminal portion 670 has a device-side terminal 671 that comes into contact with a cartridge-side terminal 89 of the cartridge 4.

The engagement formation body 677 is formed on the first device wall 67 side located further on the +Y direction side than is the support member 610. In addition, the engagement formation body 677 is located further on the −Z direction side than is the insertion/removal opening 674. In the engagement formation body 677, four elastic attachment engagement portions (not illustrated) corresponding to the respective slots 61K, 61C, 61M, and 61Y are disposed.

Figure 4:
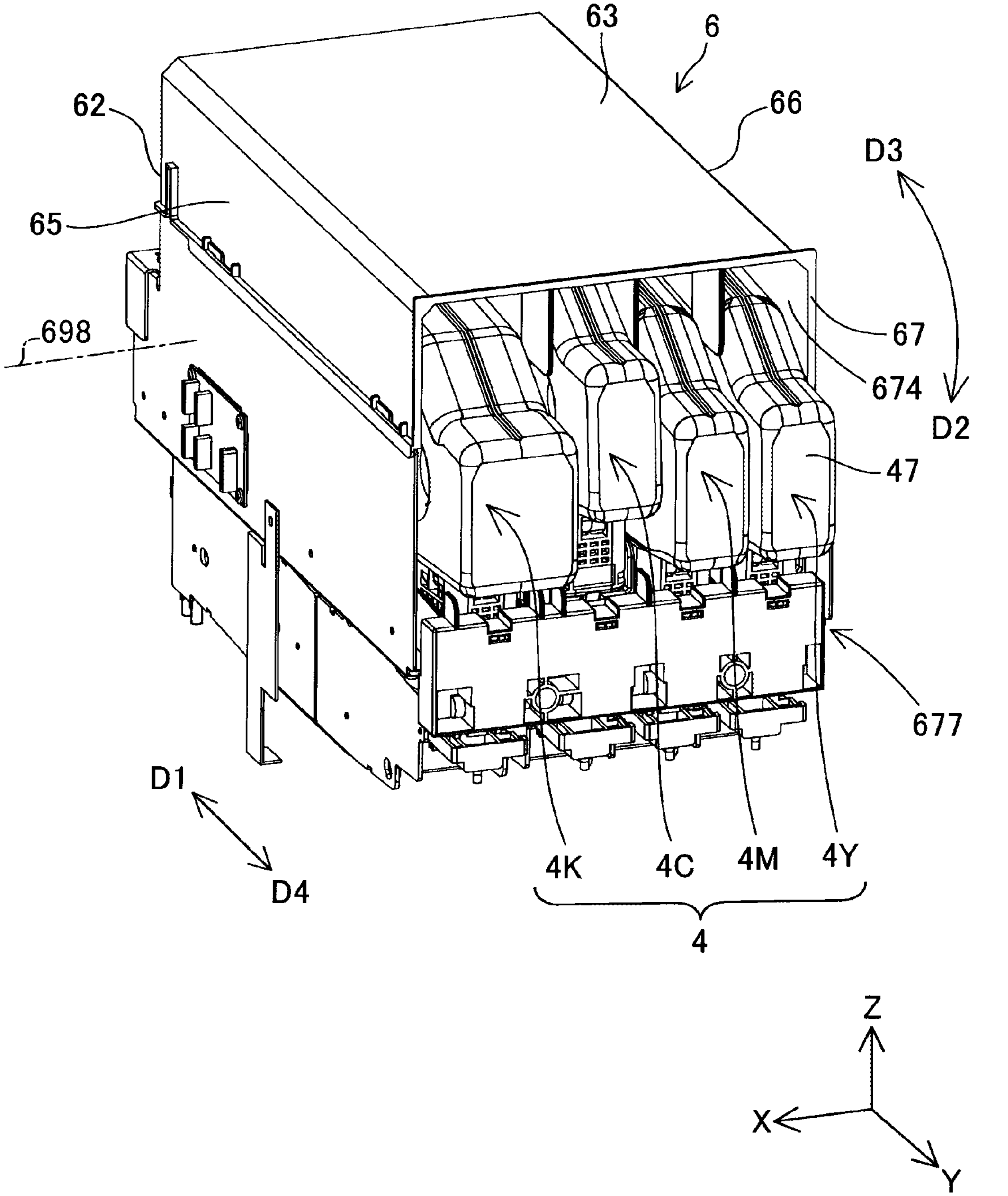
FIG. 4 is a view for explaining an attachment process of a cartridge to the cartridge attachment portion.

A-3. Description of Attachment Process of Cartridge to Cartridge Attachment Portion FIG. 4 is a view for explaining an attachment process of the cartridge 4 to the cartridge attachment portion 6. In FIG. 4, the first cartridge 4K, the third cartridge 4M, and the fourth cartridge 4Y, among the four kinds of the cartridges 4K, 4C, 4M, and 4Y, indicate an "attachment completion state" in which attachment to the cartridge attachment portion 6 is completed. The attachment completion state is a state in which the cartridge 4 is attached to the cartridge attachment portion 6 and ink as a liquid can be supplied to the printing device 10. In addition, in FIG. 4, the second cartridge 4C indicates an "insertion completion state" in which insertion into the cartridge attachment portion 6 is completed. The insertion completion state is a state in which the cartridge 4 is inserted into the cartridge attachment portion 6 but the liquid supply portion 442 of the cartridge 4 is not coupled to the liquid inlet portion 642 of the cartridge attachment portion 6.

Figure 5:
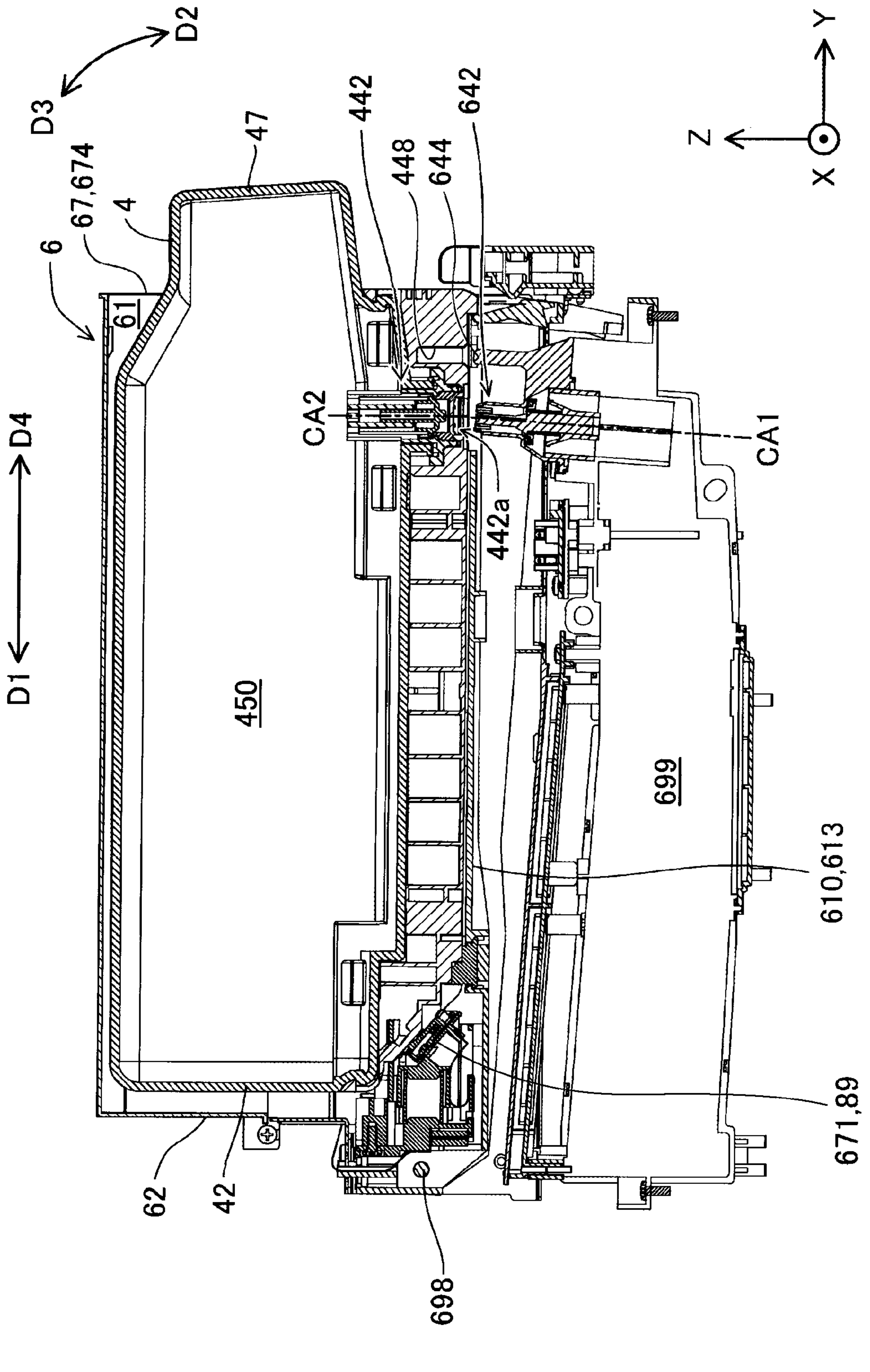
FIG. 5 is a sectional view illustrating the cartridge and the cartridge attachment portion in an insertion completion state.
Figure 6:
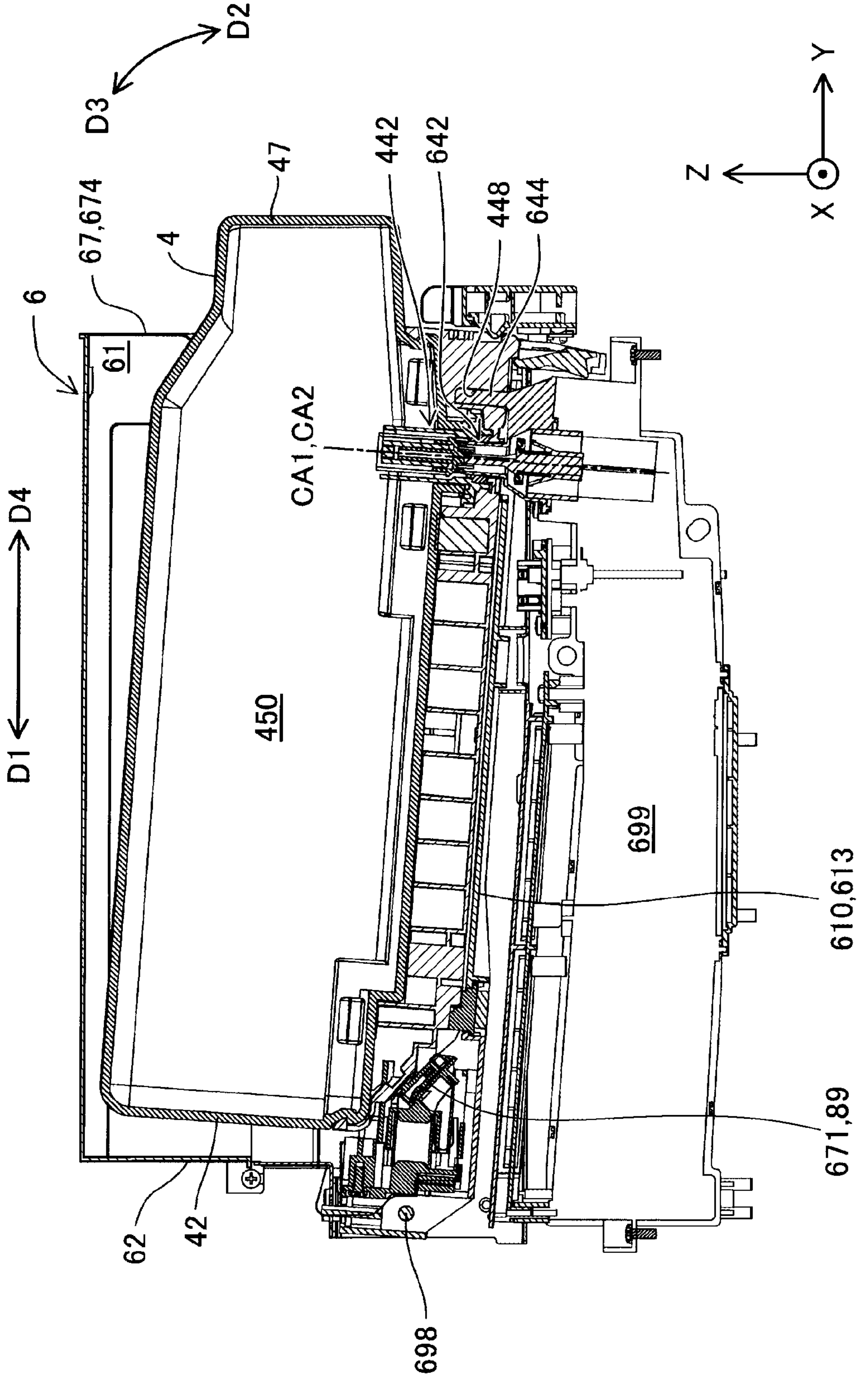
FIG. 6 is a sectional view illustrating the cartridge and the cartridge attachment portion in an attachment completion state.

FIG. 5 is a sectional view illustrating the cartridge 4 and the cartridge attachment portion 6 in the insertion completion state. FIG. 6 is a sectional view illustrating the cartridge 4 and the cartridge attachment portion 6 in the attachment completion state. Both of FIGS. 5 and 6 schematically illustrate a section cut along a YZ plane passing the inlet-portion-side central axis CA1.

As illustrated in FIGS. 4 and 5, when the cartridge 4 moves in the insertion direction D1 along the horizontal direction, the cartridge 4 is inserted to a predetermined position of the cartridge attachment portion 6. Thereafter, as illustrated in FIG. 6, the cartridge 4 is rotated and moved in a rotation attachment direction D2 having a −Z direction component using a back side of the cartridge attachment portion 6 in the insertion direction D1 as a rotation fulcrum 698 so that the attachment of the cartridge 4 to the cartridge attachment portion 6 is completed. Specifically, when the cartridge 4 is attached to the cartridge attachment portion 6, the attachment process is executed. The attachment process has a terminal coupling process and a supply portion coupling process executed after the terminal coupling process.

As illustrated in FIG. 5, the terminal coupling process is a process in which, through the insertion/removal opening 674 of the first device wall 67, the cartridge 4 is moved in the −Y direction, which is the insertion direction D1 and is inserted into the accommodation chamber 61 of the cartridge attachment portion 6 so that the cartridge 4 is inserted to a predetermined position. The predetermined position is a position where a contact of the cartridge-side terminal 89 of the cartridge 4 with the device-side terminal 671 of the cartridge attachment portion 6 is completed.

As illustrated in FIGS. 5 and 6, the supply portion coupling process is a process in which, while the contact of the device-side terminal 671 with the cartridge-side terminal 89 is maintained, the liquid inlet portion 642 of the cartridge attachment portion 6 is coupled to the liquid supply portion 442 of the cartridge 4. A detailed configuration of the cartridge 4 such as the liquid supply portion 442 will be described later. In the supply portion coupling process, when a main body rear wall 47 side of the cartridge 4 is rotated and moved, around the rotation fulcrum 698 of the cartridge attachment portion 6, in the rotation attachment direction D2 indicated by the arrow, the liquid inlet portion 642 is coupled to the liquid supply portion 442. Note that as illustrated in FIG. 4, when the cartridge 4 is engaged by the engagement formation body 677 provided on the first device wall 67 side of the cartridge attachment portion 6, the attachment completion state is maintained.

As illustrated by FIGS. 5 and 6, when the cartridge 4 is removed from the cartridge attachment portion 6, the user lifts the main body rear wall 47 side of the cartridge 4. As a result, the user rotates and moves a main body front wall 42 side located on a side opposite to the main body rear wall 47 side in the Y direction in a coupling release direction D3, which is an opposite direction of the rotation attachment direction D2, using the rotation fulcrum 698 as a fulcrum. At the time of the rotary movement, the engagement by the engagement formation body 677 illustrated in FIG. 4 is released. After the cartridge 4 is rotated and moved in the coupling release direction D3 and the cartridge 4 is in the insertion completion state illustrated in FIG. 5, the cartridge 4 is moved in the +Y direction, which is the removal direction D4, whereby the cartridge 4 is removed from the cartridge attachment portion 6.

A-4. Detailed Configuration of Cartridge

Figure 7:
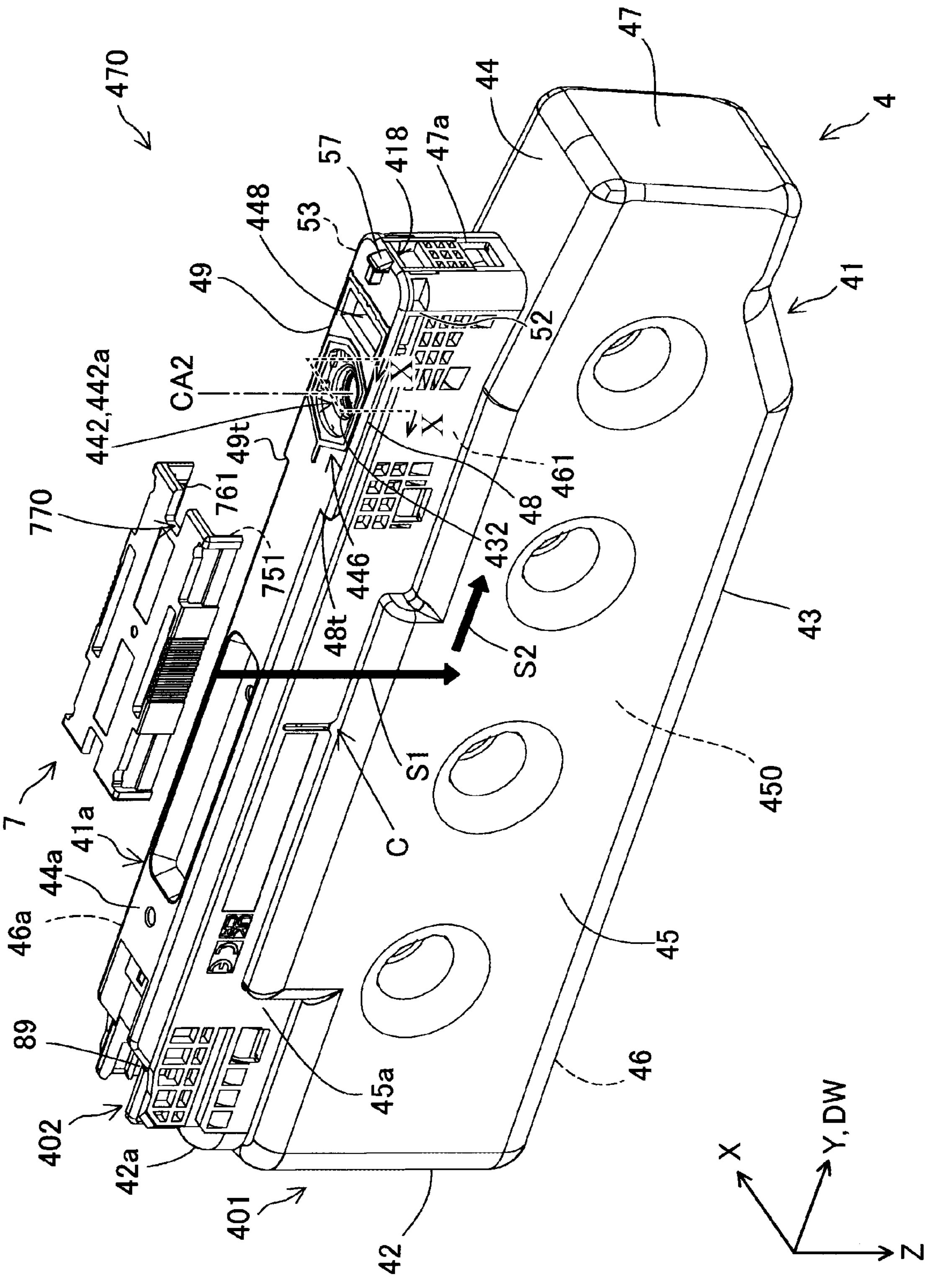
FIG. 7 is a perspective view of a cartridge unit in a non-attachment state.

FIG. 7 is a perspective view of a cartridge unit 470 in a non-attachment state. The cartridge unit 470 includes the cartridge 4 having the liquid supply portion 442 and the cap 7 that is detachably attached to the cartridge 4. The "non-attachment state" here indicates a state in which the cap 7 is not attached to the cartridge 4. On the other hand, an "attachment state" in the present disclosure indicates a state in which the cap 7 is attached to the cartridge 4. When the cap 7 is attached to the cartridge 4, after the cap 7 is brought close to the cartridge 4 (step S1), the cap 7 is slid in an attachment direction DW along the outer shape of the cartridge 4 (step S2).

The outer shape of the cartridge 4 is a substantially rectangular parallelepiped shape. With regard to the cartridge 4, the X direction is a width direction, the Y direction is a depth direction, and the Z direction is a height direction. In FIG. 7 and the following figures, the X, Y, and Z directions denoted in each figure with regard to the cartridge 4 are based on the insertion completion state illustrated in FIG. 5. In the present embodiment, with regard to the outer shape of the cartridge 4, the dimension in the Y direction is the largest, and the dimension in the Z direction and the dimension in the X direction become smaller in this order. In the present embodiment, the X direction is the lateral direction of the cartridge 4, and the Y direction is the longitudinal direction of the cartridge 4.

The cartridge 4 includes a liquid container 401 and an adaptor 402. The adaptor 402 is attached to the liquid container 401 by fitting.

The liquid container 401 includes a main body portion 41 that forms an outer shell, a liquid containing portion 450, and the liquid supply portion 442. The main body portion 41 has a main body front wall 42, the main body rear wall 47, a main body upper wall 43, a main body bottom wall 44, a first main body side wall 45, and a second main body side wall 46. The main body front wall 42 forms a wall on the −Y direction side of the main body portion 41. The main body rear wall 47 faces the main body front wall 42 in the Y direction and forms a wall on the +Y direction side of the main body portion 41. The main body upper wall 43 forms a wall on the +Z direction side of the main body portion 41. The main body bottom wall 44 faces the main body upper wall 43 in the Z direction and forms a wall on the −Z direction side of the main body portion 41. That is, the main body bottom wall 44 is a wall on a side where the liquid inlet portion 642 is located in the insertion completion state illustrated in FIG. 5. As illustrated in FIG. 7, the main body upper wall 43 and the main body bottom wall 44 intersect the main body front wall 42 and the main body rear wall 47. The first main body side wall 45 forms a wall on the −X direction side of the main body portion 41. The second main body side wall 46 faces the first main body side wall 45 in the X direction and forms a wall on the +X direction side of the main body portion 41. The first main body side wall 45 and the second main body side wall 46 each intersect the main body front wall 42, the main body rear wall 47, the main body upper wall 43, and the main body bottom wall 44.

The liquid containing portion 450 is a liquid reservoir for containing ink as a liquid. The liquid containing portion 450 is formed in an internal space of the liquid container 401.

As illustrated in FIGS. 5 and 7, the liquid contained inside the liquid supply portion 442 flows out to the outside. Specifically, the liquid supply portion 442 is a member for supplying the liquid contained in the liquid containing portion 450 to the liquid inlet portion 642 of the cartridge attachment portion 6. The liquid supply portion 442 has an outlet opening 432 through which the liquid contained in the liquid containing portion 450 flows out to the outside. The liquid supply portion 442 is in communication with the liquid containing portion 450 through the outlet opening 432. The liquid supply portion 442 has a supply-portion-side central axis CA2. The liquid supply portion 442 is a cylindrical member projecting toward the adaptor 402 side from the main body bottom wall 44 and extending along the supply-portion-side central axis CA2. In the present embodiment, the supply-portion-side central axis CA2 is an axis extending along the Z axis. That is, in the present embodiment, the Z direction is a direction extending along the liquid supply portion 442.

As illustrated in FIG. 7, the adaptor 402 includes an outer shell portion 41*a* that forms an outer shell, a supply portion arrangement chamber 461, and the cartridge-side supply portion positioning portion 448 that positions the cartridge 4 with respect to the cartridge attachment portion 6.

The outer shell portion 41*a* has an adaptor front wall 42*a*, an adaptor rear wall 47*a*, an adaptor bottom wall 44*a*, an adaptor first side wall 45*a*, and an adaptor second side wall 46*a*. The adaptor front wall 42*a* forms a wall on the −Y direction side of the outer shell portion 41*a*. The adaptor rear wall 47*a* faces the adaptor front wall 42*a* in the Y direction and forms a wall on the +Y direction side of the outer shell portion 41*a*. The adaptor bottom wall 44*a* faces the main body bottom wall 44 in the Z direction in an attached state in which the adaptor 402 is attached to the liquid container 401 and forms a wall on the −Z direction side of the outer shell portion 41*a*. The adaptor bottom wall 44*a* intersects the adaptor front wall 42*a* and the adaptor rear wall 47*a*. The adaptor first side wall 45*a* forms a wall on the −X direction side of the outer shell portion 41*a*. The adaptor second side wall 46*a* faces the adaptor first side wall 45*a* in the X direction and forms a wall on the +X direction side of the outer shell portion 41*a*. The adaptor first side wall 45*a* and the adaptor second side wall 46*a* each intersect the adaptor front wall 42*a*, the adaptor rear wall 47*a*, and the adaptor bottom wall 44*a*.

The supply portion arrangement chamber 461 is a space provided for accommodating the liquid supply portion 442 in the attached state in which the adaptor 402 is attached to the liquid container 401. The supply portion arrangement chamber 461 is formed in a portion, of the adaptor 402, on the +Y direction side, which is the removal direction D4, surrounded by the adaptor bottom wall 44*a*, the adaptor first side wall 45*a*, and the adaptor second side wall 46*a*.

Figure 8:
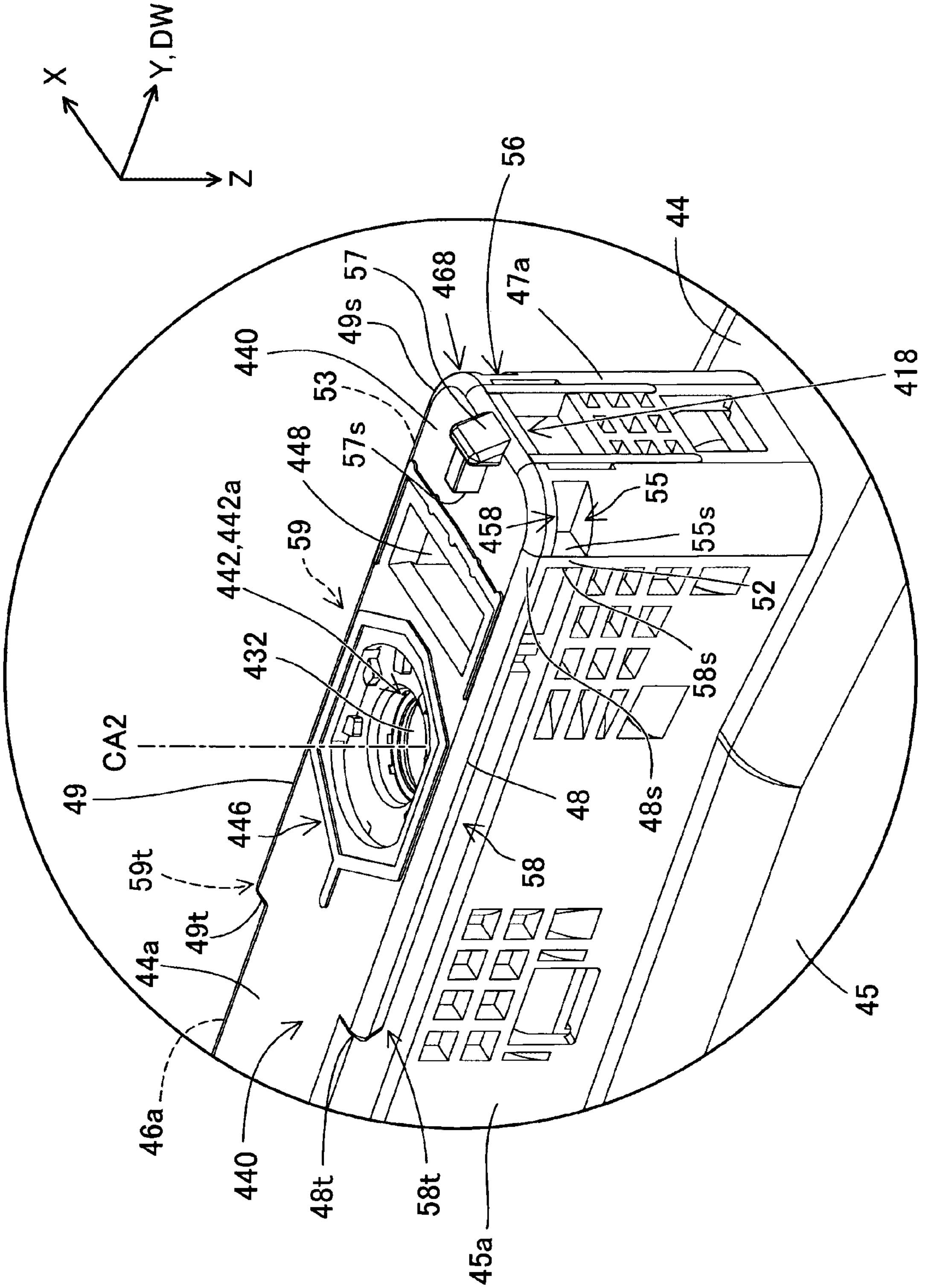
FIG. 8 is a first view enlarging a periphery of a liquid supply portion.
Figure 9:
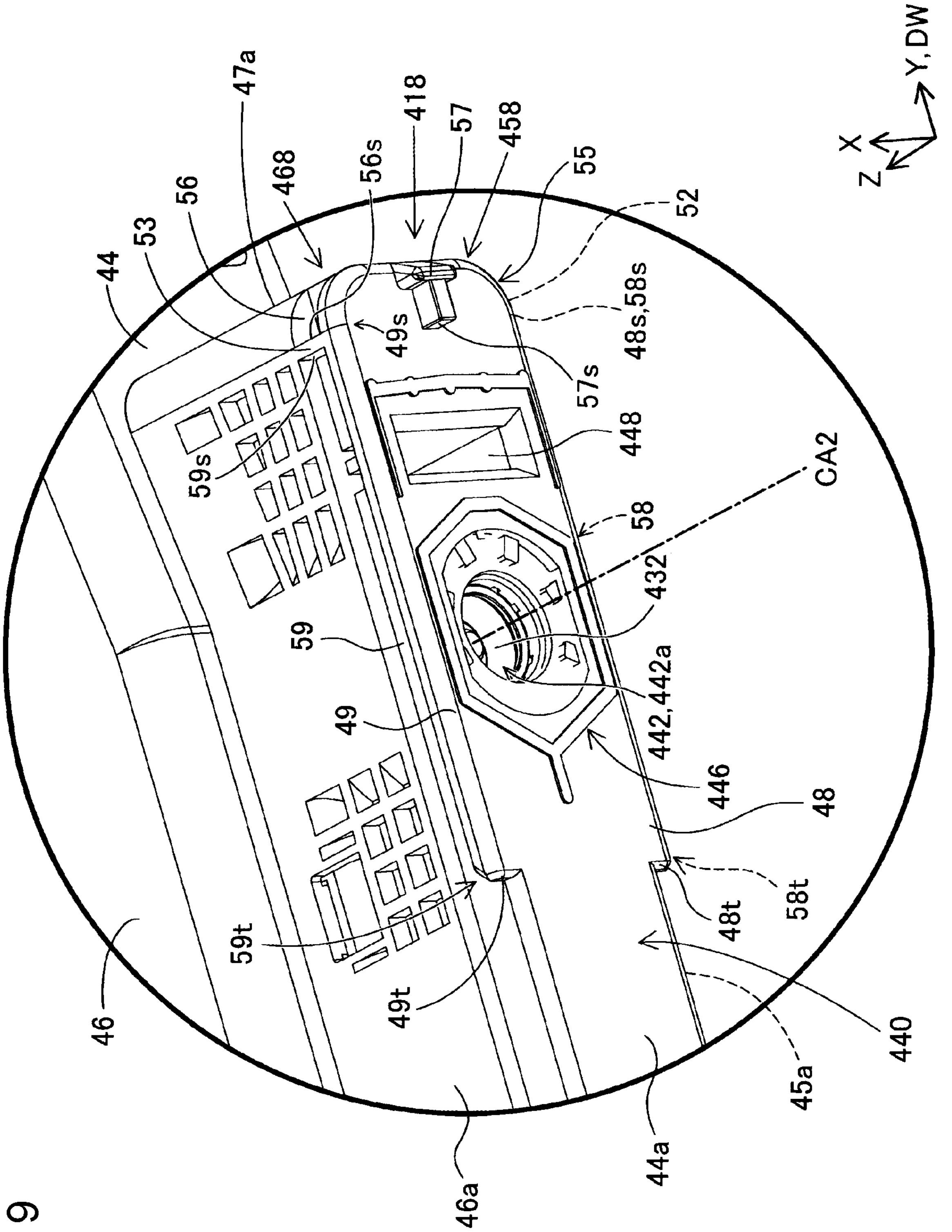
FIG. 9 is a second view enlarging a periphery of the liquid supply portion.

FIG. 8 is a first view enlarging a periphery of the liquid supply portion 442. FIG. 8 illustrates a state in which the periphery of the liquid supply portion 442 is viewed from the adaptor first side wall 45*a* side. FIG. 9 is a second view enlarging a periphery of the liquid supply portion 442. FIG. 9 illustrates a state in which the periphery of the liquid supply portion 442 is viewed from the adaptor second side wall 46*a* side. The adaptor bottom wall 44*a* has a bottom wall main body 440 that forms the bottom wall of the cartridge 4 and a bottom wall opening 446.

As illustrated in FIG. 8, the bottom wall opening 446 exposes the outlet opening 432. The bottom wall opening 446 is a hole that is formed so as to pass through the adaptor bottom wall 44*a* from an inner surface to an outer surface. The bottom wall opening 446 is formed in a portion, of the bottom wall main body 440, where the supply portion arrangement chamber 461 is located. In the present embodiment, the bottom wall opening 446 is formed on the +Y direction side, of the bottom wall main body 440, near the adaptor rear wall 47*a*. In the bottom wall opening 446, another end side 442*a* of the liquid supply portion 442 is disposed in the attached state in which the adaptor 402 is attached to the liquid container 401. In addition, the liquid supply portion 442 is disposed such that the supply-portion-side central axis CA2 passes through the bottom wall opening 446.

The cartridge-side supply portion positioning portion 448 receives the device-side supply portion positioning portion 644 to position the liquid supply portion 442 with respect to the liquid inlet portion 642. The cartridge-side supply portion positioning portion 448 is a recessed portion that is recessed from the outer surface of the adaptor bottom wall 44*a*. The cartridge-side supply portion positioning portion 448 is located on a side opposite to the cartridge-side terminal 89 with the liquid supply portion 442 and the bottom wall opening 446 interposed therebetween with regard to the insertion direction D1. In the present embodiment, the cartridge-side supply portion positioning portion 448 is formed in the adaptor bottom wall 44*a* between a coupling portion of the adaptor bottom wall 44*a* to the adaptor rear wall 47*a* and the bottom wall opening 446.

The adaptor 402 further includes, as positioning members for the cap 7 with respect to the cartridge 4, a cartridge-side arrangement determination portion 57, a pair of guide ribs 48 and 49, a pair of dents 58 and 59, a pair of corner cavities 55 and 56, and a pair of cartridge-side regulating portions 52 and 53. The shape and configuration of the adaptor 402 are plane symmetry with respect to the YZ plane as a symmetric plane.

Figure 10:
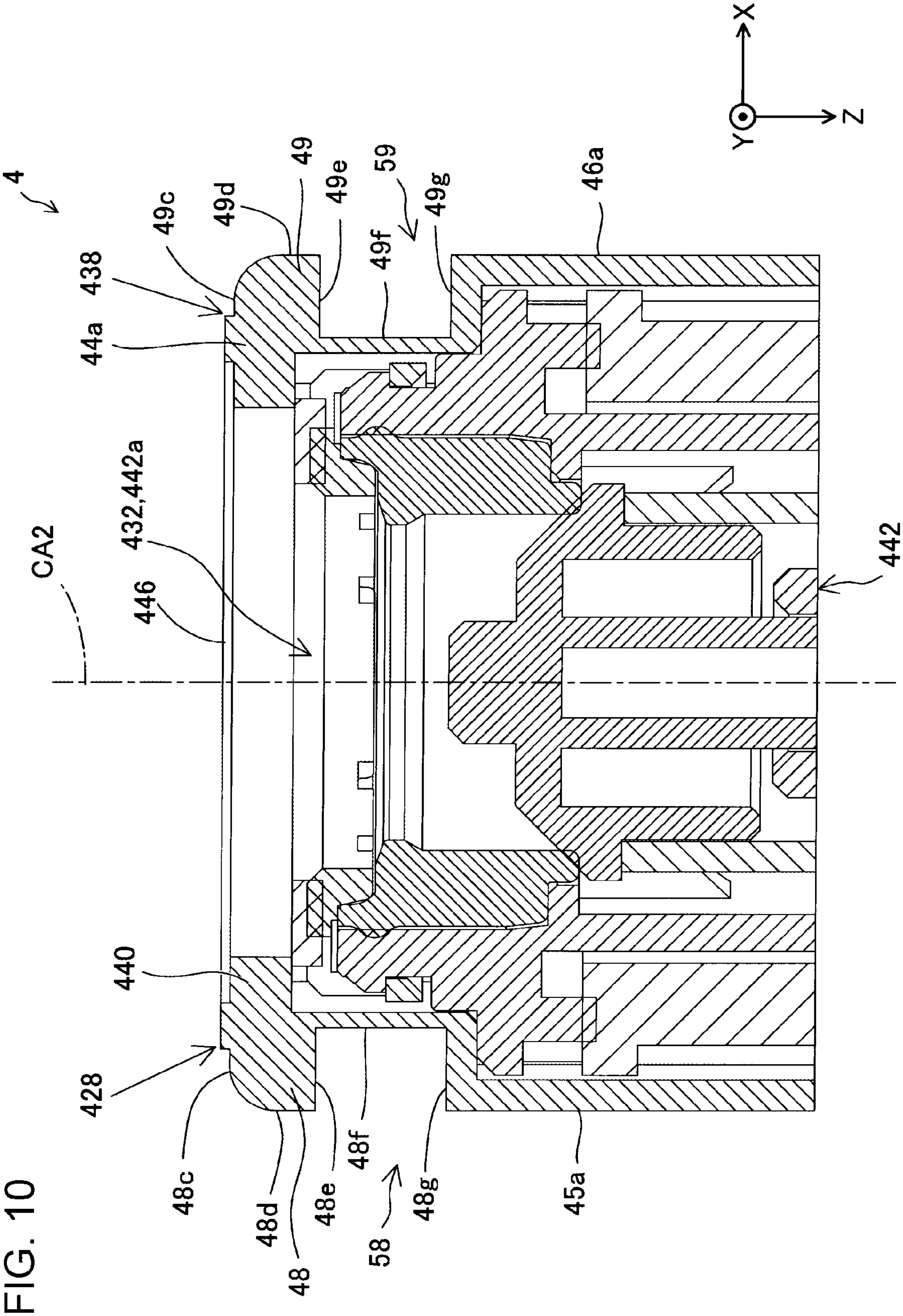
FIG. 10 is a sectional view taken along line X-X of FIG. 7.

The cartridge-side arrangement determination portion 57 regulates the movement of the cap 7 in the attachment direction DW with respect to the cartridge 4. In the present embodiment, the attachment direction DW is the +Y direction. The cartridge-side arrangement determination portion 57 is a positioning member that makes a pair with a cap-side arrangement determination portion 770 of the cap 7 described later. The cartridge-side arrangement determination portion 57 is provided on the +Y direction side of the cartridge 4. In the present embodiment, the cartridge-side arrangement determination portion 57 is provided in the center in the X direction at a first intersection 418 at which the adaptor bottom wall 44*a* and the adaptor rear wall 47*a* intersect. In addition, the cartridge-side arrangement determination portion 57 projects outward in the Z direction from the bottom wall main body 440. That is, the cartridge-side arrangement determination portion 57 projects in the −Z direction from the bottom wall main body 440. The cartridge-side arrangement determination portion 57 has a cartridge-side arrangement determination surface 57*s* that forms a surface on the −Y direction side. FIG. 10 is a sectional view taken along line X-X of FIG. 7. FIG. 10 schematically illustrates a section when the cartridge 4 is cut along a YZ plane passing the supply-portion-side central axis CA2. The pair of guide ribs 48 and 49 is the first guide rib 48 and the second guide rib 49. The first guide rib 48 and the second guide rib 49 each regulate the movement of the cap 7 in the −Z direction with respect to the cartridge 4 when the cap 7 is attached to the cartridge 4 and in the attachment state in which the cap 7 is attached to the cartridge 4. Moreover, the first guide rib 48 further regulates the movement of the cap 7 in the +X direction with respect the cartridge 4 when the cap 7 is attached to the cartridge 4 and in the attachment state. The first guide rib 48 is a positioning member that makes a pair with a first recessed portion 708 of the cap 7 described later. The second guide rib 49 regulates the movement of the cap 7 in the −X direction with respect the cartridge 4 when the cap 7 is attached to the cartridge 4 and in the attachment state. The second guide rib 49 is a positioning member that makes a pair with a second recessed portion 709 of the cap 7 described later.

As illustrated in FIG. 7, the first guide rib 48 and the second guide rib 49 each extend in the Y direction along the longitudinal direction of the cartridge 4 on the +Y direction side where the outlet opening 432 is located. Specifically, as illustrated in FIG. 8, one end portion 48*s* of the first guide rib 48 is located on a first corner 458 side where the adaptor bottom wall 44*a*, the adaptor first side wall 45*a*, and the adaptor rear wall 47*a* intersect. Another end portion 48*t* of the first guide rib 48 is located closer to the bottom wall opening 446 than to a central portion C illustrated in FIG. 7 in the Y direction of the cartridge 4. As illustrated in FIG. 9, one end portion 49*s* of the second guide rib 49 is located on a second corner 468 side where the adaptor bottom wall 44*a*, the adaptor second side wall 46*a*, and the adaptor rear wall 47*a* intersect. Another end portion 49*t* of the second guide rib 49 is formed closer to the bottom wall opening 446 side than to the central portion C illustrated in FIG. 7 in the Y direction of the cartridge 4.

Moreover, as illustrated in FIG. 10, the first guide rib 48 and the second guide rib 49 each project outward in the X direction, which is the lateral direction of the cartridge 4. In the present embodiment, the first guide rib 48 projects toward the −X direction side from the adaptor first side wall 45*a*, at a second intersection 428 at which the adaptor bottom wall 44*a* and the adaptor first side wall 45*a* intersect. In addition, the second guide rib 49 projects toward the +X direction side from the adaptor second side wall 46*a*, at a third intersection 438 at which the adaptor bottom wall 44*a* and the adaptor second side wall 46*a* intersect. Therefore, the projecting direction of the first guide rib 48 and the projecting direction of the second guide rib 49 are directions opposite to each other.

As illustrated in FIG. 10, the first guide rib 48 has a first ceiling surface 48*c* coupled to the bottom wall main body 440, a first outer side surface 48*d* coupled to the first ceiling surface 48*c*, and a first regulating surface 48*e* coupled to the first outer side surface 48*d*. The first ceiling surface 48*c* is a surface parallel to the bottom wall main body 440 and includes an X direction component and a Y direction component. The first outer side surface 48*d* is a surface including a portion projecting toward the −X direction side, which is the outermost side, in the first guide rib 48. The first outer side surface 48*d* is a surface parallel to the adaptor first side wall 45*a* and includes a Y direction component and a Z direction component. The first regulating surface 48*e* is a surface extending from the −X direction side, which is the outer side, to the +X direction side, which is the inner side, in the first guide rib 48 and is a surface parallel to the bottom wall main body 440.

The second guide rib 49 has a second ceiling surface 49*c* coupled to the bottom wall main body 440, a second outer side surface 49*d* coupled to the second ceiling surface 49*c*, and a second regulating surface 49*e* coupled to the second outer side surface 49*d*. The second ceiling surface 49*c* is a surface parallel to the bottom wall main body 440 and includes an X direction component and a Y direction component. The second outer side surface 49*d* is a surface including a portion projecting toward the +X direction side, which is the outermost side in the second guide rib 49. The second outer side surface 49*d* is a surface parallel to the adaptor second side wall 46*a* and includes a Y direction component and a Z direction component. The second regulating surface 49*e* is a surface extending from the +X direction side, which is the outer side, to the −X direction side, which is the inner side, in the second guide rib 49 and is a surface parallel to the bottom wall main body 440. Note that as illustrated in FIG. 10, a coupling portion of the first ceiling surface 48*c* and the first outer side surface 48*d* and a coupling portion of the second ceiling surface 49*c* and the second outer side surface 49*d* may have a curvature. By so doing, when the cap 7 is attached to the cartridge 4, the possibility of interference between the cap 7 and the cartridge 4 can be reduced. In addition, a coupling portion of the first outer side surface 48*d* and the first regulating surface 48*e* and a coupling portion of the second outer side surface 49*d* and the second regulating surface 49*e* may also have a curvature.

As illustrated in FIG. 10, the pair of dents 58 and 59 is the first dent 58 and the second dent 59. The first dent 58 and the second dent 59 each regulate the movement of the cap 7 in the −Z direction with respect to the cartridge 4 when the cap 7 is attached to the cartridge 4 and in the attachment state. The first dent 58 further regulates the movement of the cap 7 in the +X direction with respect the cartridge 4 when the cap 7 is attached to the cartridge 4 and in the attachment state. The first dent 58 is a positioning member that makes a pair with a first projecting rib 78 of the cap 7 described later. The second dent 59 further regulates the movement of the cap 7 in the −X direction with respect the cartridge 4 when the cap 7 is attached to the cartridge 4 and in the attachment state. The second dent 59 is a positioning member that makes a pair with a second projecting rib 79 of the cap 7 described later.

As illustrated in FIGS. 8 and 9, the first dent 58 and the second dent 59 each extend in the Y direction along the longitudinal direction of the cartridge 4 on the +Y direction side where the outlet opening 432 is located. Specifically, as illustrated in FIG. 8, one end portion 58*s* of the first dent 58 is located on the first corner 458 side. Another end portion 58*t* of the first dent 58 is located closer to the bottom wall opening 446 than to the central portion C illustrated in FIG. 7 in the Y direction of the cartridge 4. As illustrated in FIG. 9, one end portion 59*s* of the second dent 59 is located on the second corner 468 side. Another end portion 59*t* of the second dent 59 is located closer to the bottom wall opening 446 side than to the central portion C illustrated in FIG. 7 in the Y direction of the cartridge 4.

Moreover, as illustrated in FIG. 10, the first dent 58 and the second dent 59 are each recessed inward in the X direction, which is the lateral direction of the cartridge 4. Specifically, the first dent 58 is recessed toward the +X direction side, which is the adaptor second side wall 46*a* side. That is, the first dent 58 is recessed in a direction opposite to the projecting direction of the first guide rib 48. The second dent 59 is recessed toward the −X direction side, which is the adaptor first side wall 45*a* side. That is, the second dent 59 is recessed in a direction opposite to the projecting direction of the second guide rib 49. Therefore, the recessed direction of the first dent 58 and the recessed direction of the second dent 59 are directions opposite to each other.

The first dent 58 is coupled to the first guide rib 48 on the −Z direction side. In detail, one side portion of the first dent 58 is formed by the first regulating surface 48*e*. Another side portion of the first dent 58 is formed by a first facing surface 48*g* facing the first regulating surface 48*e* while being separated from the first regulating surface 48*e*. The first facing surface 48*g* is coupled to the adaptor first side wall 45*a* on the +Z direction side. The first facing surface 48*g* is a surface parallel to the first regulating surface 48*e* and includes an X direction component and a Y direction component. In addition, a first bottom surface 48*f*, which is the bottom of the first dent 58, is coupled to the first regulating surface 48*e* and the first facing surface 48*g*. The first bottom surface 48*f* is a surface parallel to the adaptor first side wall 45*a* and includes a Y direction component and a Z direction component.

The second dent 59 is coupled to the second guide rib 49 on the −Z direction side. In detail, one side portion of the second dent 59 is formed by the second regulating surface 49*e*. Another side portion of the second dent 59 is formed by a second facing surface 49*g* facing the second regulating surface 49*e* while being separated from the second regulating surface 49*e*. The second facing surface 49*g* is coupled to the adaptor second side wall 46*a* on the +Z direction side. The second facing surface 49*g* is a surface parallel to the second regulating surface 49*e* and includes an X direction component and a Y direction component. In addition, a second bottom surface 49*f*, which is the bottom of the second dent 59, is coupled to the second regulating surface 49*e* and the second facing surface 49*g*. The second bottom surface 49*f* is a surface parallel to the adaptor second side wall 46*a* and includes a Y direction component and a Z direction component.

As illustrated in FIGS. 8 and 9, the pair of corner cavities 55 and 56 is the first corner cavity 55 and the second corner cavity 56. The first corner cavity 55 is a recessed portion that receives a cap-side first regulating portion 751 described later. The first corner cavity 55 has a first facing portion 55*s* that faces the cap-side first regulating portion 751. The second corner cavity 56 is a recessed portion that receives a cap-side second regulating portion 761 described later. The second corner cavity 56 has a second facing portion 56*s* that faces the cap-side second regulating portion 761. Each of the first facing portion 55*s* and the second facing portion 56*s* is a surface parallel to the adaptor rear wall 47*a* and includes an X direction component and a Z direction component.

The pair of cartridge-side regulating portions 52 and 53 each regulate the movement of the cap 7 with respect to the cartridge 4 in a direction opposite to the attachment direction DW. In the present embodiment, the direction opposite to the attachment direction DW is the −Y direction. As illustrated in FIGS. 8 and 9, the pair of cartridge-side regulating portions 52 and 53 is the cartridge-side first regulating portion 52 and the cartridge-side second regulating portion 53. The cartridge-side first regulating portion 52 is a positioning member that makes a pair with the cap-side first regulating portion 751 of the cap 7 described later. The cartridge-side second regulating portion 53 is a positioning member that makes a pair with the cap-side second regulating portion 761 of the cap 7 described later.

As illustrated in FIG. 8, the cartridge-side first regulating portion 52 is a partition wall that separates the first dent 58 from the first corner cavity 55. The cartridge-side first regulating portion 52 is formed by the one end portion 58*s* of the first dent 58 located on the +Y direction side and the first facing portion 55*s* of the first corner cavity 55. As illustrated in FIG. 9, the cartridge-side second regulating portion 53 is a partition wall that separates the second dent 59 from the second corner cavity 56. The cartridge-side second regulating portion 53 is formed by the one end portion 59*s* of the second dent 59 located on the +Y direction side and the second facing portion 56*s* of the second corner cavity 56. That is, the pair of cartridge-side regulating portions 52 and 53 is each provided on the +Y direction side of the cartridge 4.

A-5. Detailed Configuration of Cap

Figure 11:
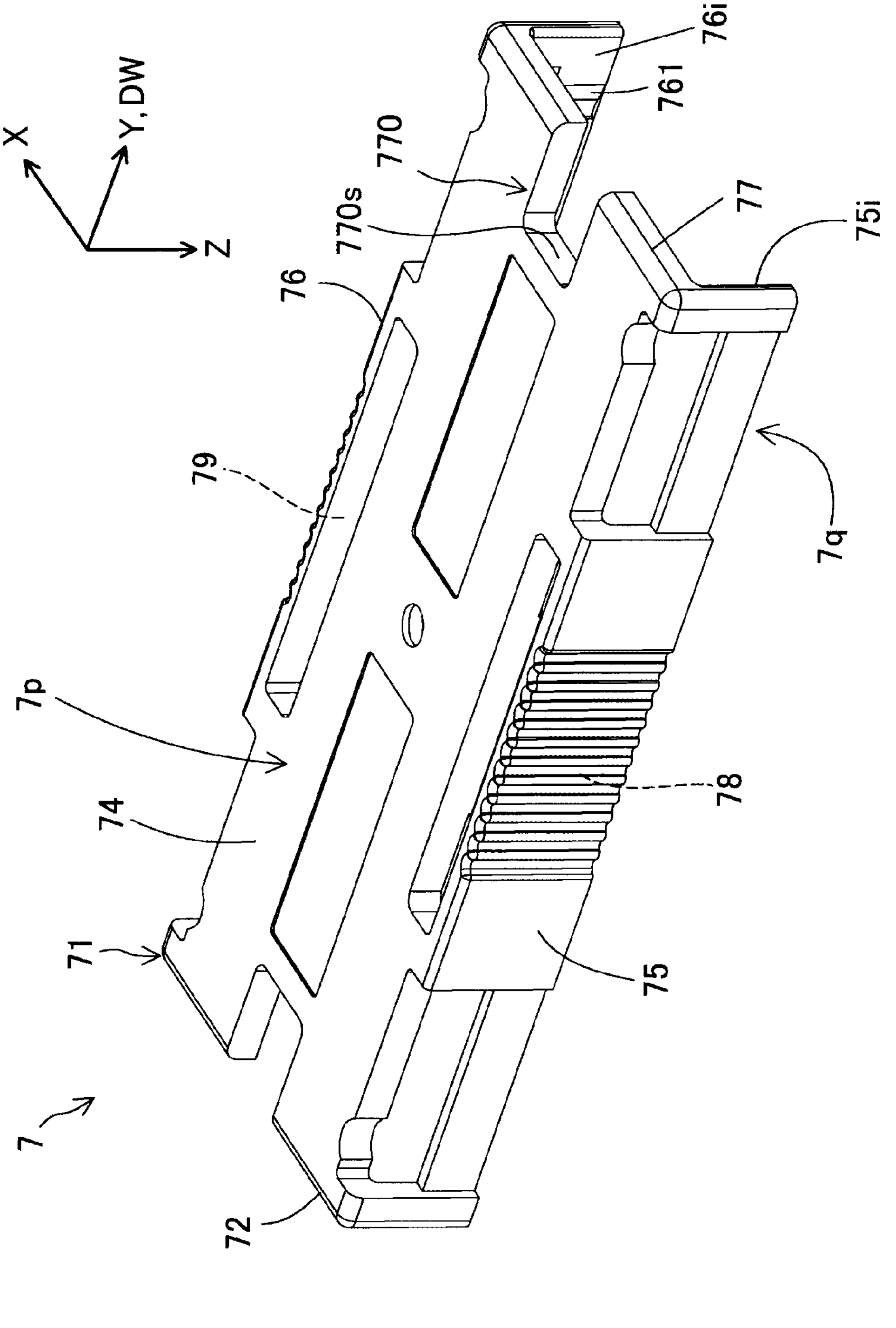
FIG. 11 is a first perspective view of a cap.
Figure 12:
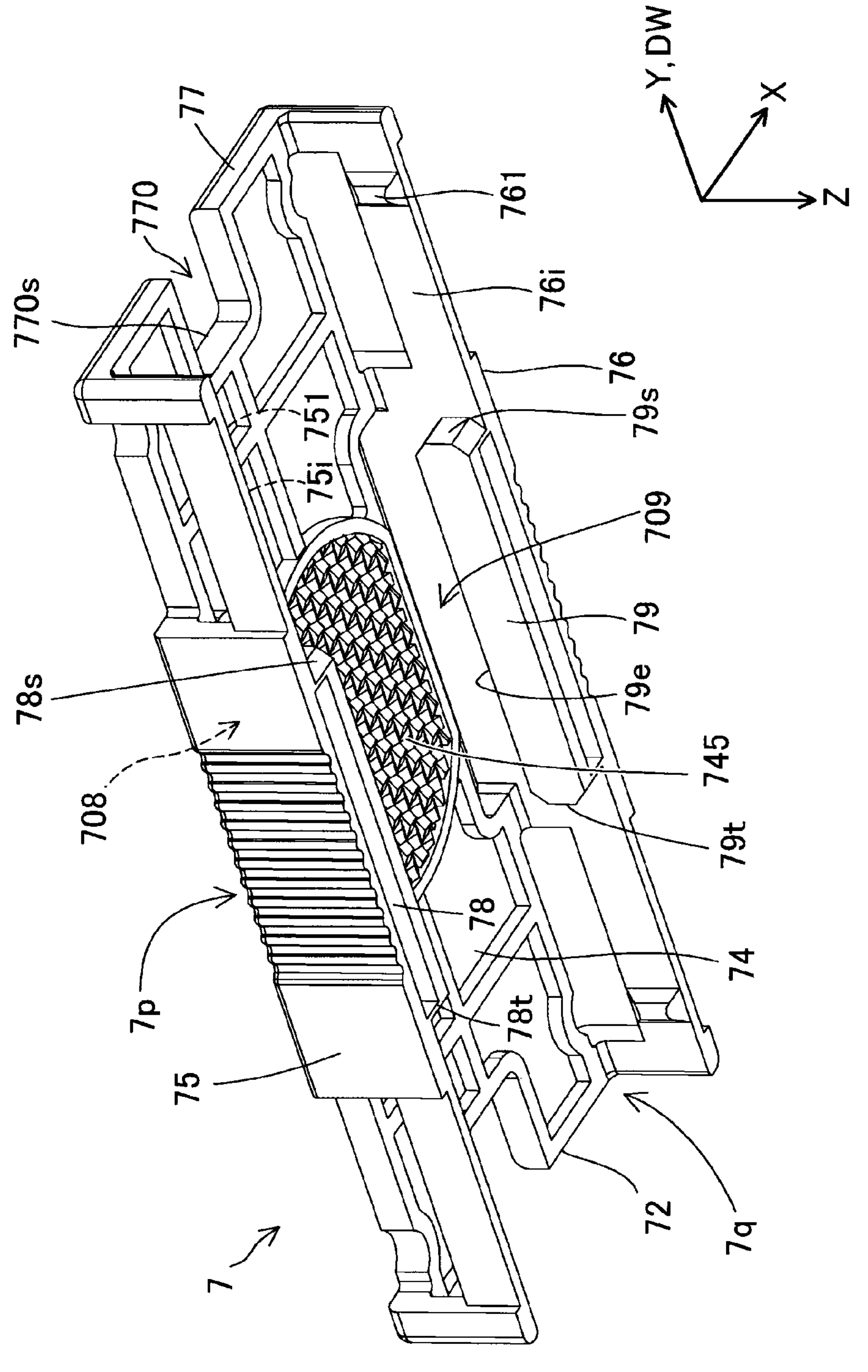
FIG. 12 is a second perspective view of the cap.
Figure 13:
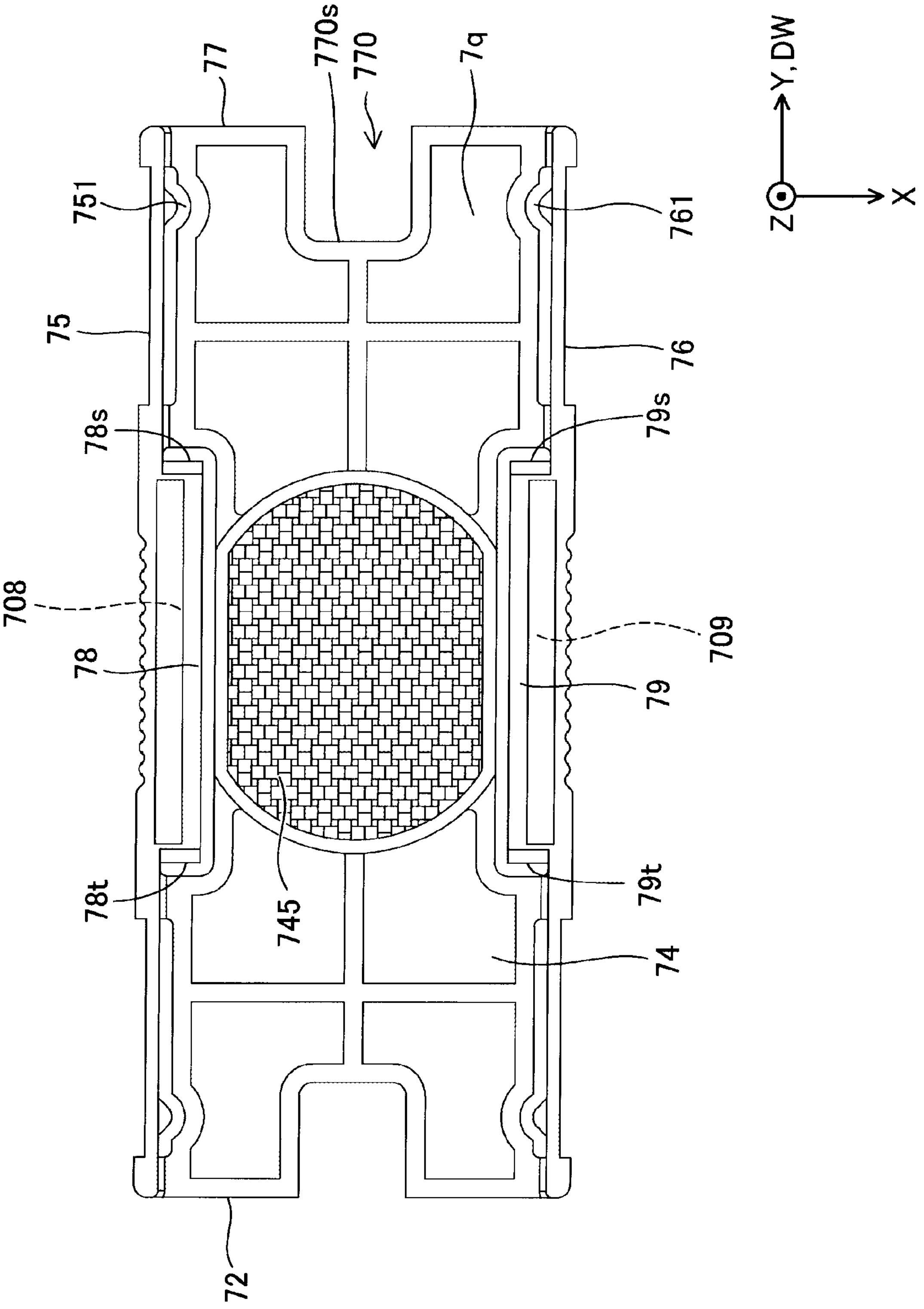
FIG. 13 is a back-side view of the cap.
Figure 14:
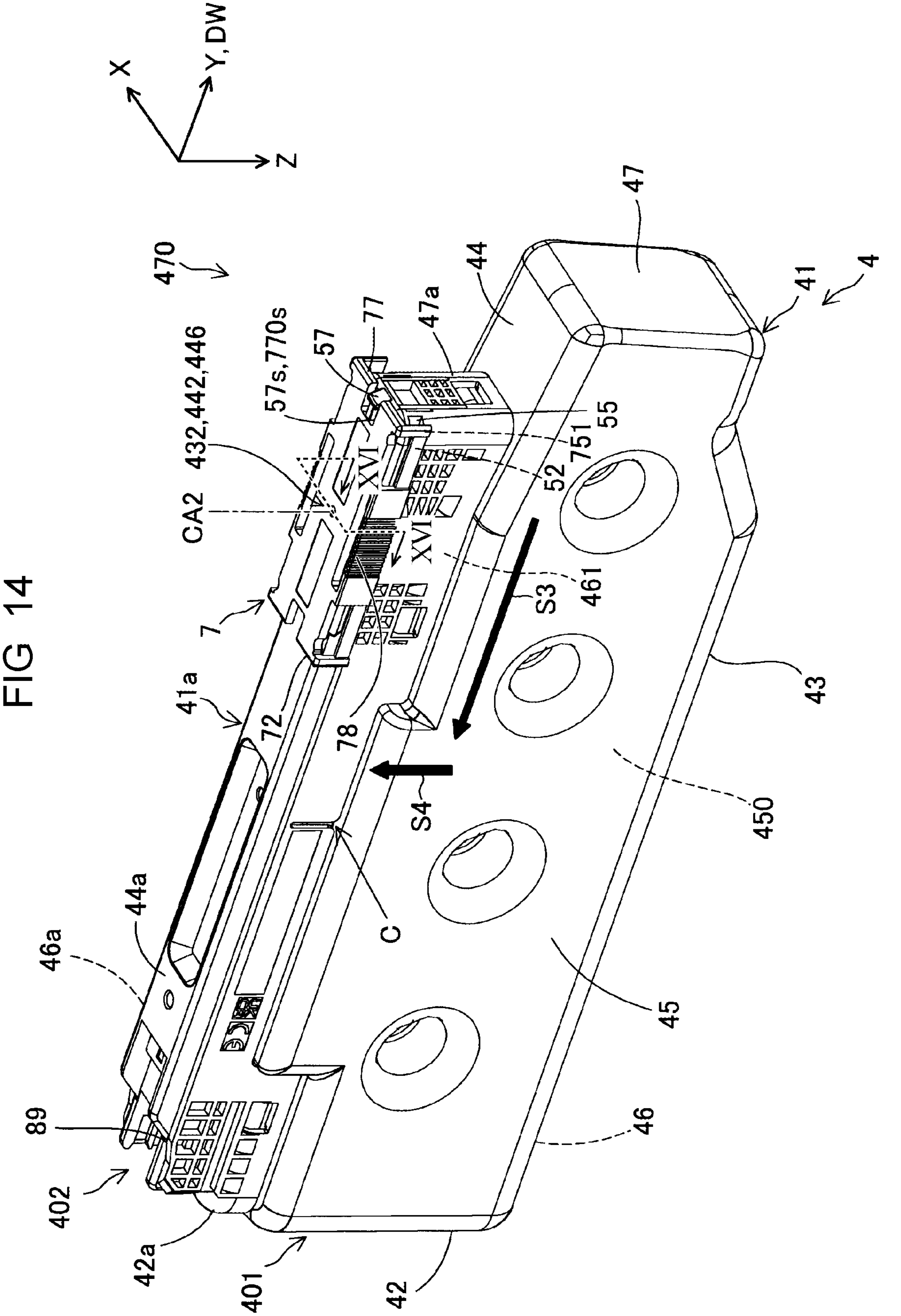
FIG. 14 is a perspective view of the cartridge unit in an attachment state.
Figure 15:
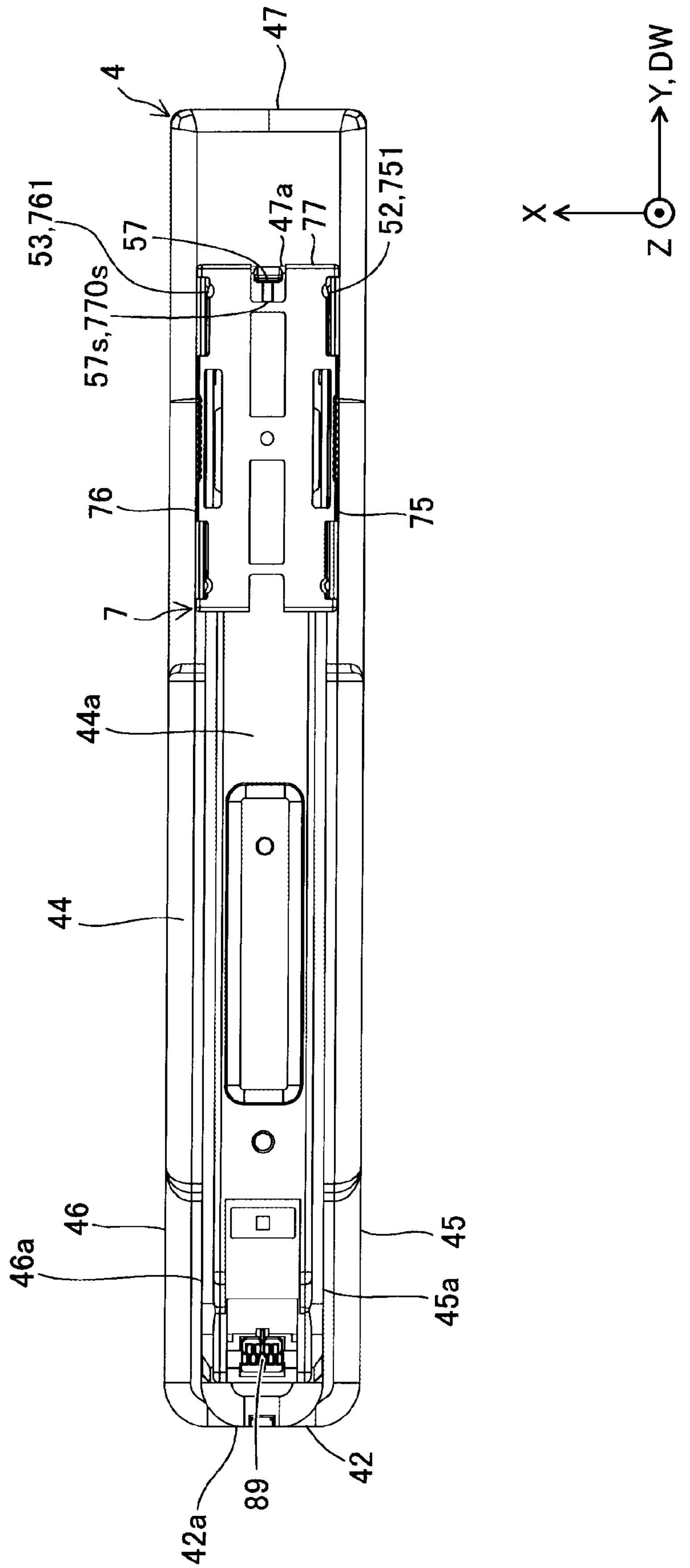
FIG. 15 is an external view of the cartridge unit in the attachment state.
Figure 16:
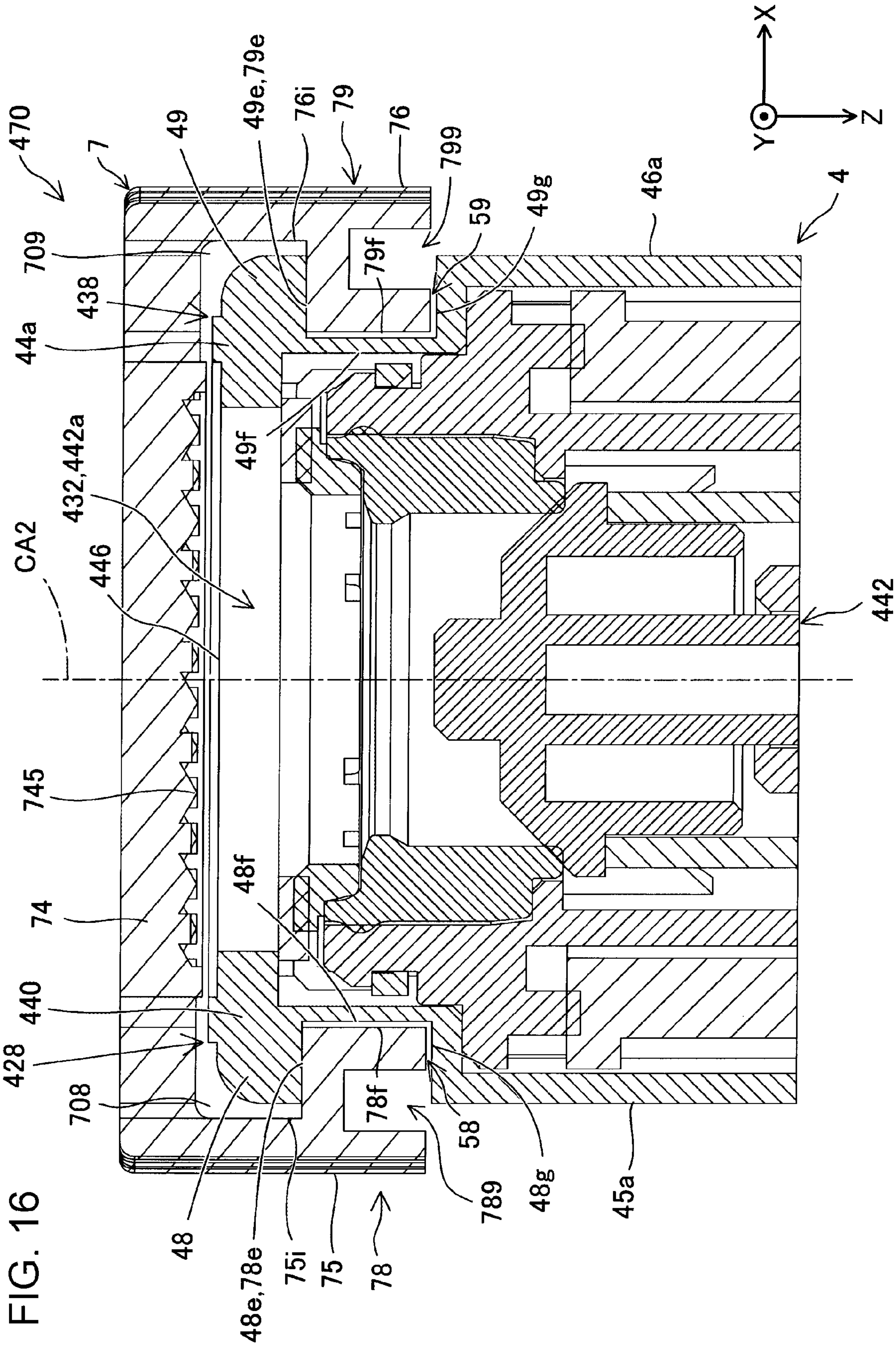
FIG. 16 is a sectional view taken along line XVI-XVI of FIG. 14.

FIG. 11 is a first perspective view of the cap 7. FIG. 11 illustrates a state in which the cap 7 is viewed from a front surface 7*p* side, which is a side opposite to a back surface 7*q* side that faces the outlet opening 432. FIG. 12 is a second perspective view of the cap 7. FIG. 12 illustrates a state in which the cap 7 is viewed from the back surface 7*q* side. FIG. 13 is a back surface view of the cap 7. FIG. 13 illustrates a state in which the cap 7 is viewed from the −Z direction side. FIG. 14 is a perspective view of the cartridge unit 470 in the attachment state. FIG. 15 is an external view of the cartridge unit 470 in the attachment state. FIG. 15 illustrates a state in which the cartridge 4 and the cap 7, in the attachment state, are viewed from the −Z direction side. FIG. 16 is a sectional view taken along line XVI-XVI of FIG. 14. FIG. 16 schematically illustrates a section, of the cartridge unit 470 in the attachment state, cut along an XZ plane passing the supply-portion-side central axis CA2. As illustrated in FIG. 11, with regard to the cap 7, the X direction is a lateral direction, the Y direction is a longitudinal direction, and the Z direction is a thickness direction. In FIG. 11 and the following figures, the X, Y, and Z directions denoted in each figure with regard to the cap 7 are based on the attachment state illustrated in FIG. 14.

Before the cartridge 4 is inserted into the cartridge attachment portion 6 illustrated in FIG. 4, the cap 7 covers the bottom wall opening 446, the outlet opening 432, and at least a part of the periphery of the bottom wall opening 446 and the outlet opening 432. As a result, the cap 7 protects the liquid supply portion 442 and, at the same time, prevents leakage of the liquid to the outside of the cartridge 4 and the cap 7 when the liquid contained in the liquid containing portion 450 leaks from the liquid supply portion 442. As illustrated in FIGS. 11 and 12, the cap 7 includes a cap main body portion 71 that forms an outer shell. The cap main body portion 71 has a sealing wall 74, a first engagement wall 75, and a second engagement wall 76.

As illustrated in FIG. 12, the sealing wall 74 forms a wall extending in the X direction and the Y direction. As illustrated in FIG. 16, in the attachment state, the sealing wall 74 is a wall parallel to the adaptor bottom wall 44*a*, which is the bottom wall of the cartridge 4. The sealing wall 74 has one end surface 77 that forms one end extending along the attachment direction DW, and another end surface 72 that forms another end on a side opposite to the one end. The one end surface 77 is a surface on the +Y direction side. The other end surface 72 is a surface on the −Y direction side. The sealing wall 74 further has a liquid holding portion 745 on the back surface 7*q* facing the outlet opening 432 of the liquid supply portion 442 in the attachment state. The liquid holding portion 745 is a member for holding a liquid when ink as the liquid contained in the liquid containing portion 450 leaks from the outlet opening 432 of the liquid supply portion 442. In the present embodiment, the liquid holding portion 745 is integrally formed with the sealing wall 74. The liquid holding portion 745 may be, for example, a structure for holding a liquid by capillary force, or a liquid absorbing member formed by a material having a property to absorb a liquid such as a porous body formed by a synthetic resin such as polyvinyl alcohol.

As illustrated in FIG. 13, the first engagement wall 75 and the second engagement wall 76 each intersect the sealing wall 74. Moreover, the first engagement wall 75 and the second engagement wall 76 face each other in the X direction. The first engagement wall 75 forms a wall on the −X direction side. As illustrated in FIG. 16, the first engagement wall 75 is a wall facing the adaptor first side wall 45*a*, which is the first side wall of the cartridge 4, in the attachment state and includes a Y direction component and a Z direction component. As illustrated in FIG. 13, the second engagement wall 76 forms a wall on the +X direction side. As illustrated in FIG. 16, the second engagement wall 76 is a wall facing the adaptor second side wall 46*a*, which is the second side wall of the cartridge 4, in the attachment state and includes a Y direction component and a Z direction component.

The cap 7 further includes, as positioning members with respect to the cartridge 4, the cap-side arrangement determination portion 770, a pair of the projecting ribs 78 and 79, a pair of the recessed portions 708 and 709, and a pair of the cap-side regulating portions 751 and 761.

Figure 17:
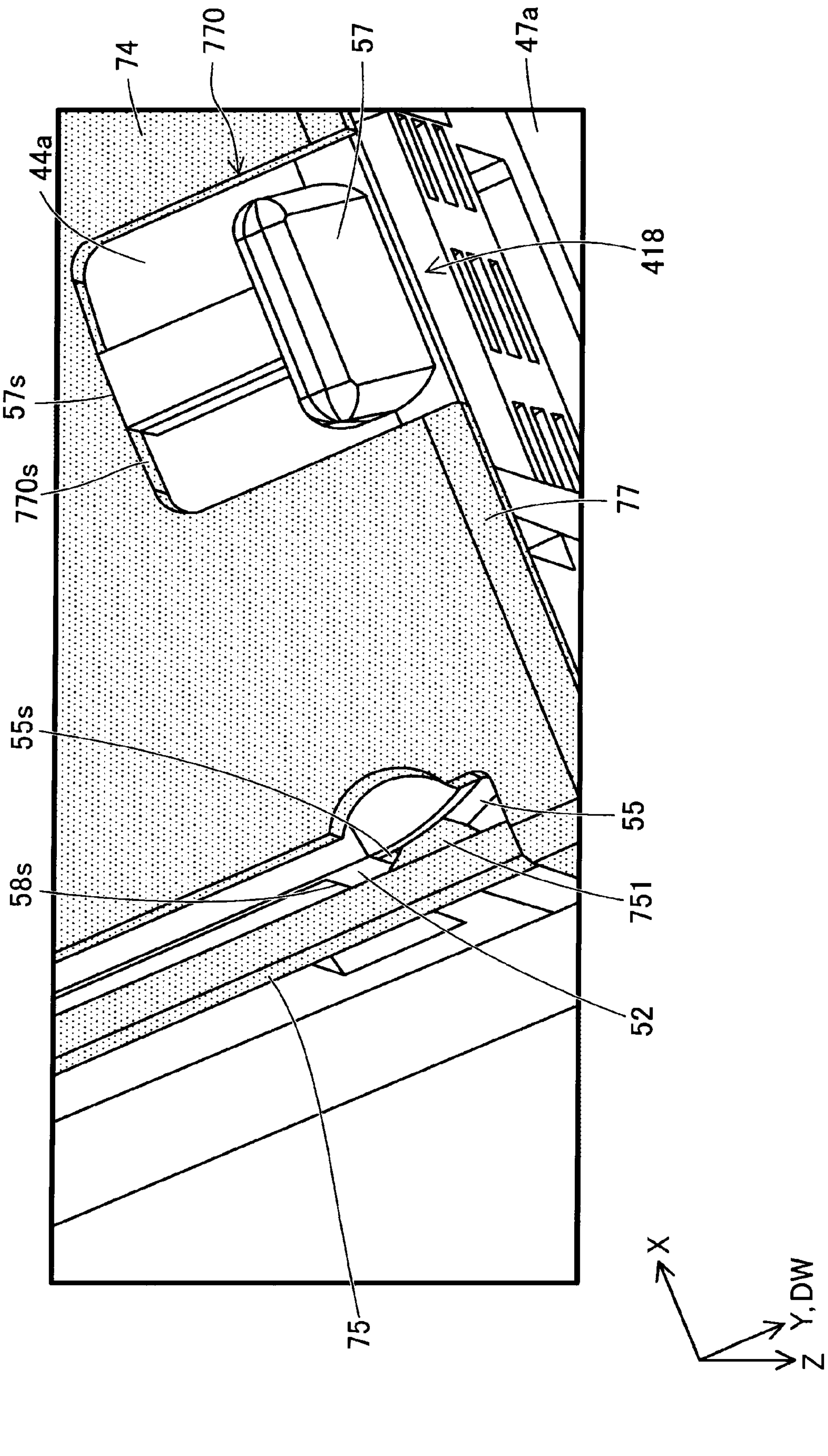
FIG. 17 is a view for explaining details of a cap-side arrangement determination portion and a cap-side regulating portion.

FIG. 17 is a view for explaining details of the cap-side arrangement determination portion 770 and the cap-side regulating portion 751. FIG. 17 illustrates a state in which the periphery of the first intersection 418 in the attachment state is viewed from the adaptor bottom wall 44*a* side. In addition, in FIG. 17, for visibility improvement, elements on the cap 7 side are dot-hatched.

As illustrated in FIGS. 15 and 17, the cap-side arrangement determination portion 770 faces the cartridge-side arrangement determination portion 57 in the attachment direction DW so as to regulate the movement in the attachment direction DW. That is, the cap-side arrangement determination portion 770 is a positioning member that makes a pair with the cartridge-side arrangement determination portion 57. The cap-side arrangement determination portion 770 is provided on the +Y direction side of the cap 7. In the present embodiment, the cap-side arrangement determination portion 770 is a cut-away portion that is cut away from the +Y direction side to the −Y direction side on the one end surface 77 of the sealing wall 74. The cap-side arrangement determination portion 770 has a cap-side arrangement determination surface 770*s* that faces the cartridge-side arrangement determination surface 57*s* in the attachment direction DW in the attachment state. In the present embodiment, the cap-side arrangement determination surface 770*s* is a surface, of the cap-side arrangement determination portion 770 as a cut-away portion, that is parallel to the one end surface 77 of the sealing wall 74 and includes an X direction component and a Z direction component.

As illustrated in FIG. 16, the pair of projecting ribs 78 and 79 is the first projecting rib 78 and the second projecting rib 79. When the cap 7 is attached to the cartridge 4 and in the attachment state, the first projecting rib 78 and the second projecting rib 79 each regulate the movement of the cap 7 in the −Z direction with respect to the cartridge 4. The first projecting rib 78 further regulates the movement of the cap 7 in the +X direction with respect to the cartridge 4 when the cap 7 is attached to the cartridge 4 and in the attachment state. When the cap 7 is attached to the cartridge 4, the first projecting rib 78 is guided by the first guide rib 48 of the cartridge 4 and, in the present embodiment, is accommodated in the first dent 58 in a slidable state. The second projecting rib 79 further regulates the movement of the cap 7 in the −X direction with respect to the cartridge 4 when the cap 7 is attached to the cartridge 4 and in the attachment state. When the cap 7 is attached to the cartridge 4, the second projecting rib 79 is guided by the second guide rib 49 of the cartridge 4 and, in the present embodiment, is accommodated in the second dent 59 in a slidable state.

As illustrated in FIGS. 12 and 13, the first projecting rib 78 and the second projecting rib 79 each extend in the Y direction along the longitudinal direction of the cap 7. Specifically, one end portion **78*s* of the first projecting rib 78 is located on the +Y direction side, which is the one end surface 77 side of the sealing wall 74. Another end portion 78*t* of the first projecting rib 78 is located on the −Y direction side, which is the other end surface 72 side of the sealing wall 74. One end portion 79*s* of the second guide rib 49 is located on the +Y direction side, which is the one end surface 77 side of the sealing wall 74. Another end portion 79*t* of the second projecting rib 79 is located on the −Y direction side, which is the other end surface 72 side of the sealing wall 74**.

Moreover, the first projecting rib 78 and the second projecting rib 79 each project inward along the X direction, which is the lateral direction of the cap 7. Specifically, as illustrated in FIG. 16, the first projecting rib 78 projects toward the +X direction side, which is a direction opposite to the −X direction that is the projecting direction of the first guide rib 48. That is, the first projecting rib 78 projects toward the +X direction side, toward the second engagement wall 76 from a first inner surface **75*i* that forms a surface on an inward side of the first engagement wall 75. In addition, the second projecting rib 79 projects toward the −X direction side, which is a direction opposite to the +X direction that is the projecting direction of the second guide rib 49. That is, the second projecting rib 79 projects toward the −X direction side, toward the first engagement wall 75 from a second inner surface 76*i* that forms a surface on an inward side of the second engagement wall 76. Therefore, the projecting direction of the first projecting rib 78 and the projecting direction of the second projecting rib 79 are directions opposite to each other As illustrated in FIG. 16, the first projecting rib 78 has a first locking surface 78*e* coupled to the first engagement wall 75 and a first top surface 78*f* coupled to the first locking surface 78*e*. When the cap 7 is attached to the cartridge 4 and in the attachment state, the first locking surface 78*e* faces the first regulating surface 48*e* of the cartridge 4 and regulates the movement toward the −Z direction side. The first locking surface 78*e* is a surface parallel to the sealing wall 74, and the normal direction is the −Z direction. When the cap 7 is attached to the cartridge 4 and in the attachment state, the first top surface 78*f* faces the first bottom surface 48*f*, which is the bottom of the first dent 58 that is recessed toward the +X direction side, which is the same as the projecting direction of the first projecting rib 78. As a result, when the cap 7 is attached to the cartridge 4 and in the attachment state, the first top surface 78*f* regulates the movement toward the +X direction side. The first top surface 78*f* is a surface including a portion projecting toward the +X direction side, which is the innermost side in the first projecting rib 78. The first top surface 78*f* is a surface parallel to the first engagement wall 75** and includes a Y direction component and a Z direction component.

The second projecting rib 79 has a second locking surface **79*e* coupled to the second engagement wall 76 and a second top surface 79*f* coupled to the second locking surface 79*e*. When the cap 7 is attached to the cartridge 4 and in the attachment state, the second locking surface 79*e* faces the second regulating surface 49*e* of the cartridge 4 and regulates the movement toward the −Z direction side. The second locking surface 79*e* is a surface parallel to the sealing wall 74, and the normal direction is the −Z direction. When the cap 7 is attached to the cartridge 4 and in the attachment state, the second top surface 79*f* faces the second bottom surface 49*f*, which is the bottom of the second dent 59 that is recessed toward the −X direction side, which is the same as the projecting direction of the second rib 79. As a result, when the cap 7 is attached to the cartridge 4 and in the attachment state, the second top surface 79*f* regulates the movement toward the −X direction side. The second top surface 79*f* is a surface including a portion projecting toward the −X direction side, which is the innermost side in the second rib 79. The second top surface 79*f* is a surface parallel to the second engagement wall 76** and includes a Y direction component and a Z direction component.

Note that in the present embodiment, as illustrated in FIG. 16, a first space portion 789 is provided between the first engagement wall 75 and the first top surface **78*f*, and a second space portion 799 is provided between the second engagement wall 76 and the second top surface 79*f*. The present disclosure is not limited to this configuration. In other embodiments, the first projecting rib 78 and the second projecting rib 79 do not have to have the space portions 789 and 799, respectively. In addition, in the present embodiment, a coupling portion between the first locking surface 78*e* and the first top surface 78*f*, and a coupling portion between the second locking surface 79*e* and the second top surface 79*f* do not have a curvature, but the present disclosure is not limited to this configuration. In other embodiments, the coupling portion between the first locking surface 78*e* and the first top surface 78*f*, and the coupling portion between the second locking surface 79*e* and the second top surface 79*f* may have a curvature in the same manner as the coupling portion between the first ceiling surface 48*c* and the first outer side surface 48*d***, for example.

As illustrated in FIGS. 12 and 16, the pair of recessed portions 708 and 709 is the first recessed portion 708 and the second recessed portion 709. As illustrated in FIG. 16, the first recessed portion 708 is a positioning member that makes a pair with the first guide rib 48 of the cartridge 4. The first recessed portion 708 is a recessed portion that is formed between the sealing wall 74 and the first projecting rib 78. Therefore, as illustrated in FIGS. 12 and 13, the first recessed portion 708 extends in the Y direction along the longitudinal direction of the cap 7. The second recessed portion 709 is a positioning member that makes a pair with the second guide rib 49 of the cartridge 4. The second recessed portion 709 is a recessed portion that is formed between the sealing wall 74 and the second projecting rib 79. Therefore, as illustrated in FIGS. 12 and 13, the second recessed portion 709 extends in the Y direction along the longitudinal direction of the cap 7.

As illustrated in FIG. 16, the first recessed portion 708 accommodates the first guide rib 48. That is, in the attachment state, the first locking surface 78*e* of the first projecting rib 78 is located on a side opposite to the sealing wall 74 with the first guide rib 48 interposed therebetween. The second recessed portion 709 accommodates the second guide rib 49. That is, in the attachment state, the second locking surface 79*e* of the second projecting rib 79 is located on a side opposite to the sealing wall 74 with the second guide rib 49 interposed therebetween. As a result, when the cap 7 is attached to the cartridge 4 and in the attachment state, the first recessed portion 708 and the second recessed portion 709 each regulate the movement of the cap 7 in the −Z direction with respect to the cartridge 4. In addition, when the cap 7 is attached to the cartridge 4 and in the attachment state, the first recessed portion 708 further regulates the movement of the cap 7 in the +X direction with respect to the cartridge 4. That is, when the cap 7 is attached to the cartridge 4 and in the attachment state, the first recessed portion 708 functions as a rail member that guides the first guide rib 48. In addition, when the cap 7 is attached to the cartridge 4 and in the attachment state, the second recessed portion 709 regulates the movement of the cap 7 in the −X direction with respect to the cartridge 4. That is, when the cap 7 is attached to the cartridge 4 and in the attachment state, the second recessed portion 709 functions as a rail member that guides the second guide rib 49.

As illustrated in FIGS. 12 and 13, the pair of cap-side regulating portions 751 and 761 is the cap-side first regulating portion 751 and the cap-side second regulating portion 761. As illustrated in FIG. 17, the cap-side first regulating portion 751 is a positioning member that makes a pair with the cartridge-side first regulating portion 52. The cap-side first regulating portion 751 is a projection projecting toward the +X direction side, toward the second engagement wall 76 from the first inner surface 75*i* of the first engagement wall 75. In the present embodiment, since the cartridge-side first regulating portion 52 is formed on the +Y direction side of the cartridge 4, the cap-side first regulating portion 751 is formed on the +Y direction side, on which the one end surface 77 of the sealing wall 74 is located. When the cap 7 is attached to the cartridge 4 and in the attachment state, the cap-side first regulating portion 751 faces the cartridge-side first regulating portion 52 in the attachment direction DW so as to regulates the movement in the −Y direction, which is a direction opposite to the attachment direction DW. In the attachment state, the cap-side first regulating portion 751 is accommodated in the first corner cavity 55.

As illustrated in FIG. 15, the cap-side second regulating portion 761 is a positioning member that makes a pair with the cartridge-side second regulating portion 53. The cap-side second regulating portion 761 is a projection projecting toward the −X direction side, toward the first engagement wall 75 from the second inner surface 76*i* of the second engagement wall 76. In the present embodiment, since the cartridge-side second regulating portion 53 is formed on the +Y direction side of the cartridge 4, the cap-side second regulating portion 761 is formed on the +Y direction side, on which the one end surface 77 of the sealing wall 74 is located. When the cap 7 is attached to the cartridge 4 and in the attachment state, the cap-side second regulating portion 761 faces the cartridge-side second regulating portion 53 in the attachment direction DW so as to regulates the movement in the −Y direction, which is a direction opposite to the attachment direction DW. In addition, in the attachment state, the cap-side second regulating portion 761 is accommodated in the second corner cavity 56.

The cap-side first regulating portion 751 and the cap-side second regulating portion 761 are each flexible. The cap-side first regulating portion 751 and the cap-side second regulating portion 761 are each, for example, a both-end fixed spring formed of a synthetic resin.

A-6. Description of Method for Attaching and Detaching Cap to and from Cartridge As illustrated in FIG. 7, when the cap 7 is attached to the cartridge 4, first, the cap 7 is disposed in the central portion C of the cartridge 4 so that the adaptor bottom wall 44*a* of the cartridge 4 is substantially parallel to the sealing wall 74 of the cap 7. The "central portion C" here indicates a region that does not include the other end portion 48*t* of the first guide rib 48 and the other end portion 49*t* of the second guide rib 49. Next, in this state, the cap 7 is brought close to the adaptor bottom wall 44*a* and moved in the +Z direction (step S1). As a result, the cap 7 is disposed in the central portion C of the adaptor bottom wall 44*a*.

Next, in a state in which the first guide rib 48 of the cartridge 4 is accommodated in the first recessed portion 708 of the cap 7, and the second guide rib 49 of the cartridge 4 is accommodated in the second recessed portion 709 of the cap 7, the cap 7 is slid in the +Y direction, which is the attachment direction DW (step S2). In detail, in step S2, the cap 7 is slid toward the outlet opening 432 from the central portion C side of the cartridge 4 so that the first regulating surface 48*e* and the first locking surface 78*e* face and come into contact, and the second regulating surface 49*e* and the second locking surface 79*e* face and come into contact. As illustrated in FIG. 16, the first projecting rib 78 is engaged with the first dent 58, and the second projecting rib 79 is engaged with the second dent 59. The cap-side first regulating portion 751 illustrated in FIG. 13 slides inside the first dent 58 until reaching the cartridge-side first regulating portion 52 illustrated in FIG. 8, that is, the one end portion 58*s* of the first dent 58. In addition, the cap-side second regulating portion 761 illustrated in FIG. 13 slides inside the second dent 59 until reaching the cartridge-side second regulating portion 53 illustrated in FIG. 9, that is, the one end portion 59*s* of the second dent 59.

In the process of sliding the cap 7 toward the outlet opening 432 side from the central portion C side of the cartridge 4, the cap-side first regulating portion 751 reaches the cartridge-side first regulating portion 52, and at the same time, the cap-side second regulating portion 761 reaches the cartridge-side second regulating portion 53. At this time, the cap-side first regulating portion 751 and the cap-side second regulating portion 761 are flexible. Therefore, in a state in which the cap-side first regulating portion 751 is in contact with the one end portion 58*s* of the first dent 58, when the cap 7 is further pushed in the +Y direction, which is the attachment direction DW, the cap-side first regulating portion 751 is bent and deformed, passes over the cartridge-side first regulating portion 52, and is accommodated in the first corner cavity 55.

Similarly, in a state in which the cap-side second regulating portion 761 is in contact with the one end portion 59*s* of the second dent 59, when the cap 7 is further pushed in the +Y direction, which is the attachment direction DW, the cap-side second regulating portion 761 is bent and deformed, passes over the cartridge-side second regulating portion 53, and is accommodated in the second corner cavity 56. As a result, the cartridge-side first regulating portion 52 and the cap-side first regulating portion 751 face each other in the attachment direction DW. In addition, the cartridge-side second regulating portion 53 and the cap-side second regulating portion 761 face each other in the attachment direction DW. As a result, the movement in the −Y direction, which is a direction opposite to the attachment direction DW, can be regulated.

Moreover, in a state in which the cap-side first regulating portion 751 is accommodated in the first corner cavity 55, and the cap-side second regulating portion 761 is accommodated in the second corner cavity 56, the cap-side arrangement determination surface 770*s* of the cap-side arrangement determination portion 770 comes into contact with the cartridge-side arrangement determination surface 57*s* of the cartridge-side arrangement determination portion 57. As a result, in a state in which the cartridge-side arrangement determination portion 57 and the cap-side arrangement determination portion 770 face each other in the attachment direction DW so that the movement in the attachment direction DW is regulated, the cap 7 can be attached to the cartridge 4.

On the other hand, as illustrated in FIG. 14, when the cap 7 is removed from the cartridge 4, the cap 7 is slid in the −Y direction, which is a direction opposite to the attachment direction DW (step S3). At this time, in a state in which the cap-side first regulating portion 751 is in contact with the first facing portion 55*s* of the first corner cavity 55, when the cap 7 is further pushed in the −Y direction, which is a direction opposite to the attachment direction DW, the cap-side first regulating portion 751 is bent and deformed, passes over the cartridge-side first regulating portion 52, and is accommodated in the first dent 58. Similarly, in a state in which the cap-side second regulating portion 761 is in contact with the second facing portion 56*s* of the second corner cavity 56, when the cap 7 is further pushed in the −Y direction, which is a direction opposite to the attachment direction DW, the cap-side second regulating portion 761 is bent and deformed, passes over the cartridge-side second regulating portion 53, and is accommodated in the second dent 59. In addition, in a state in which the cap-side first regulating portion 751 is accommodated in the first dent 58, and the cap-side second regulating portion 761 is accommodated in the second dent 59, the cap 7 is further slid in the −Y direction, which is a direction opposite to the attachment direction DW. Therefore, the cap 7 is moved to the central portion C of the cartridge 4 so as to release the engagement of the first recessed portion 708 with the first guide rib 48, and at the same time, release the engagement of the second recessed portion 709 with the second guide rib 49.

Next, in a state in which the engagement of the first recessed portion 708 with the first guide rib 48 is released, and the engagement of the second recessed portion 709 with the second guide rib 49 is released, the cap 7 is moved in the −Z direction so that the cap 7 is distant from the adaptor bottom wall 44*a* (step S4). As a result, the cap 7 can be removed from the cartridge 4.

According to the above-described first embodiment, as illustrated in FIG. 16, when the cap 7 is attached to the cartridge 4 and in the attachment state, the first guide rib 48 is accommodated in the first recessed portion 708, and the second guide rib 49 is accommodated in the second recessed portion 709. As a result, in two directions of the X direction extending along the lateral direction of the cap 7 and the Z direction intersecting the X direction and extending along the liquid supply portion 442, the movement of the cap 7 with respect to the cartridge 4 can be regulated. As a result, even when the cartridge 4 receives an external shock by falling or the like, the possibility of coming off of the cap 7 attached to the cartridge 4 from the cartridge 4 can be reduced.

In addition, according to the above-described first embodiment, as illustrated in FIG. 16, the first projecting rib 78 has the first locking surface 78*e* that faces the first regulating surface 48*e* of the cartridge 4. The second projecting rib 79 has the second locking surface 79*e* that faces the second regulating surface 49*e* of the cartridge 4. By so doing, when the cap 7 is attached to the cartridge 4 and in the attachment state, the movement of the cap 7 in the −Z direction with respect to the cartridge 4 can be regulated.

In addition, according to the above-described first embodiment, as illustrated in FIG. 16, the first projecting rib 78 has the first top surface 78*f* that faces the first bottom surface 48*f*, which is the bottom of the first dent 58 formed in the adaptor first side wall 45*a*. By so doing, when the cap 7 is attached to the cartridge 4 and in the attachment state, the movement of the cap 7 in the +X direction with respect to the cartridge 4 can be regulated. In addition, the second projecting rib 79 has the second top surface 79*f* that faces the second bottom surface 49*f*, which is the bottom of the second dent 59 formed in the adaptor second side wall 46*a*. By so doing, the movement of the cap 7 in the −X direction with respect to the cartridge 4 can be regulated.

In addition, according to the above-described first embodiment, as illustrated in FIG. 16, while at least a part of the first projecting rib 78 is accommodated in the first dent 58, and at least a part of the second projecting rib 79 is accommodated in the second dent 59, the cap 7 can be attached to the cartridge 4. Therefore, the cap 7 is more smoothly attached to the cartridge 4.

In addition, according to the above-described first embodiment, as illustrated in FIG. 17, when the cap 7 is attached to the cartridge 4 and in the attachment state, the cap 7 can regulate the movement in the Y direction by the cap-side regulating portions 751 and 761, and the cap-side arrangement determination portion 770. That is, as illustrated in FIGS. 15 and 16, when the cap 7 is attached to the cartridge 4 and in the attachment state, the cap 7 according to the above-described first embodiment can regulate the movement of the cap 7 with respect to the cartridge 4 in the three-dimensional directions of the X direction, the Y direction, and the Z direction. As a result, even when the cartridge 4 receives an external shock by falling or the like, the possibility of coming off of the cap 7 attached to the cartridge 4 from the cartridge 4 can be further reduced.

In addition, according to the above-described first embodiment, as illustrated in FIGS. 15 and 16, the movement of the cap 7 with respect to the cartridge 4 in the three-dimensional directions of the X direction, the Y direction, and the Z direction can be regulated. Therefore, the outlet opening 432 of the cartridge 4 and the liquid holding portion 745 of the cap 7 can be further reliably caused to face each other. That is, by engagement regulation of the cap 7 with respect to the cartridge 4, the positional relationship between the outlet opening 432 and the liquid holding portion 745 can be fixed and maintained. Therefore, even when the liquid contained in the liquid containing portion 450 leaks from the liquid supply portion 442, the possibility of leakage of ink as a liquid to the outside of the cap 7 can be reduced.

In addition, according to the above-described first embodiment, as illustrated in FIG. 14, the printing system 1 includes the cartridge unit 470 including the cartridge 4 and the cap 7 attached to the cartridge 4. when the cap 7 is attached to the cartridge 4 and in the attachment state, the cartridge unit 470 can regulate the movement of the cap 7 with respect to the cartridge 4 in the three-dimensional directions of the X direction, the Y direction, and the Z direction. As a result, even when the cartridge 4 receives an external shock by falling or the like, the possibility of coming off of the cap 7 attached to the cartridge 4 from the cartridge 4 can be reduced.

B. Second Embodiment

Figure 18:
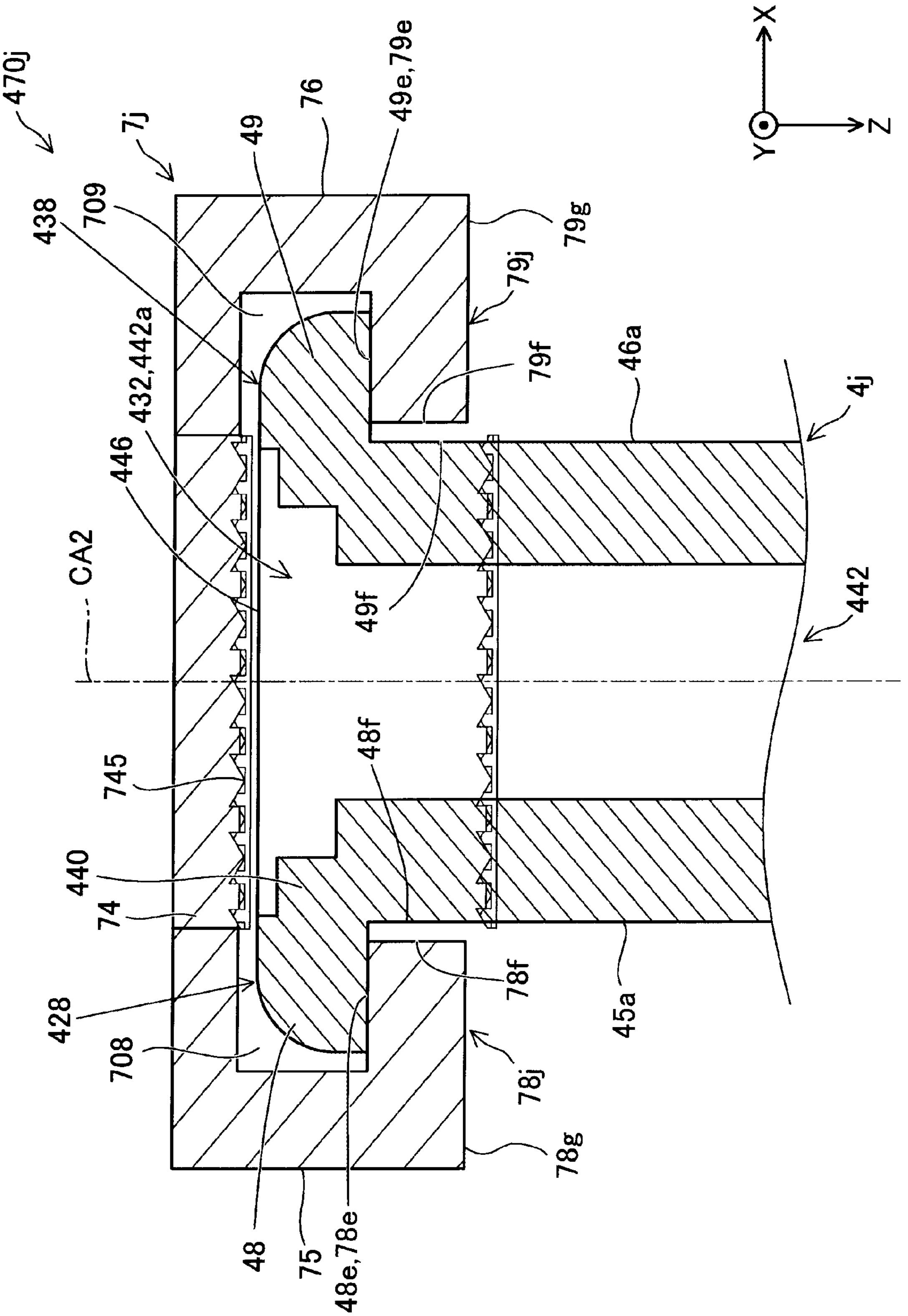
FIG. 18 is a view for explaining a configuration of a cartridge unit according to a second embodiment.

FIG. 18 is a view for explaining a configuration of a cartridge unit 470*j* according to a second embodiment. FIG. 18 schematically illustrates a section, cut along an XZ plane passing the supply-portion-side central axis CA2, of a cartridge 4*j* and a cap 7*j* in the attachment state in the present embodiment. In the present embodiment, the X, Y, and Z directions denoted with regard to the cartridge 4*j* and the cap 7*j* are the same as the first embodiment and based on the attachment state. In the present embodiment, a part of the elements of the cartridge 4*j* and the cap 7*j* is different from the first embodiment. Other elements are the same as the first embodiment. The same elements as the first embodiment are denoted by the same reference numerals, and the description are omitted.

In the present embodiment, in the cartridge 4*j*, the first dent 58 and the second dent 59 illustrated in FIG. 16 are not formed. That is, as illustrated in FIG. 18, in the attachment state, the first bottom surface 48*f* of the cartridge 4*j* that faces the first top surface 78*f* of the cap 7*j* is formed by the adaptor first side wall 45*a*. In addition, the second bottom surface 49*f* that faces the second top surface 79*f* is formed by the adaptor second side wall 46*a*. Even in such an aspect, when the cap 7*j* is attached to the cartridge 4*j* and in the attachment state, the cap 7*j* can accommodate the first guide rib 48 of the cartridge 4*j* in the first recessed portion 708 and can accommodate the second guide rib 49 in the second recessed portion 709. Therefore, even when the cap 7*j* does not have the first dent 58 and the second dent 59, the movement of the cap 7*j* with respect to the cartridge 4*j* at least in the X direction and in the Z direction can be regulated.

In addition, in the present embodiment, the first projecting rib 78 does not have the first space portion 789, and the second projecting rib 79 does not have the second space portion 799. As a result, the first engagement wall 75 and the first top surface 78*f* are coupled by a first coupling surface 78*g* that is parallel to the first locking surface 78*e* and includes an X direction component and a Y direction component. The second engagement wall 76 and the second top surface 79*f* are coupled by a second coupling surface 79*g* that is parallel to the second locking surface 79*e* and includes an X direction component and a Y direction component. Even in such an aspect, when the cap 7*j* is attached to the cartridge 4*j* and in the attachment state, the cap 7*j* can accommodate the first guide rib 48 of the cartridge 4*j* in the first recessed portion 708 and can accommodate the second guide rib 49 in the second recessed portion 709.

C. Third Embodiment

Figure 19:
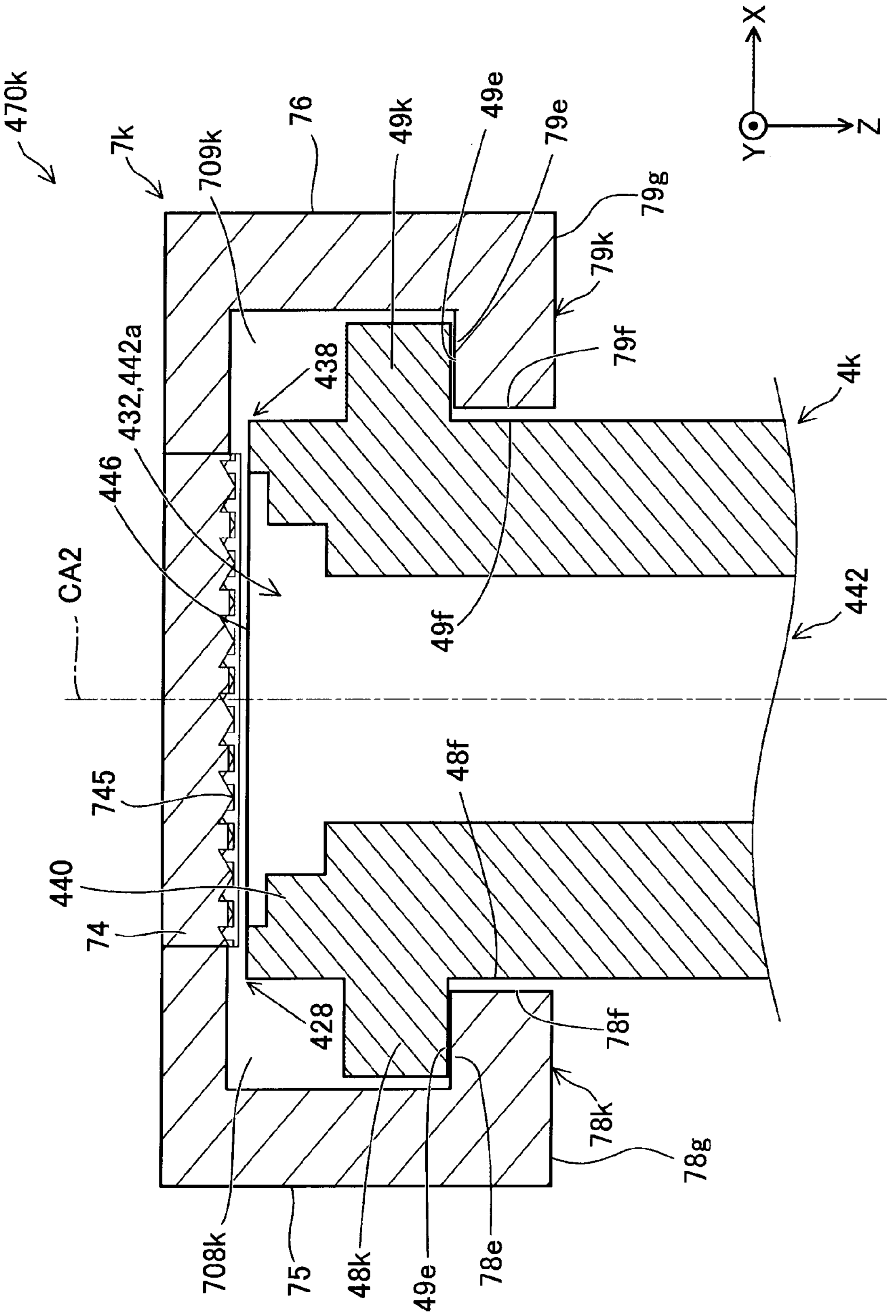
FIG. 19 is a view for explaining a configuration of a cartridge unit according to a third embodiment.

FIG. 19 is a view for explaining a configuration of a cartridge unit 470*k* according to a third embodiment. FIG. 19 schematically illustrates a section, cut along an XZ plane passing the supply-portion-side central axis CA2, of a cartridge 4*k* and a cap 7*k* in the attachment state in the present embodiment. In the present embodiment, the X, Y, and Z directions denoted with regard to the cartridge 4*k* and the cap 7*k* are the same as the second embodiment and based on the attachment state. In the present embodiment, the formation positions of the first guide rib 48*k* and the second guide rib 49*k* in the cartridge 4*k* are different from the second embodiment illustrated in FIG. 18. As a result, the formation positions of the first projecting rib 78*k* and the second projecting rib 79*k* in the cap 7*k* are different from the second embodiment. The present embodiment is the same as the second embodiment in that the cartridge 4*k* according to the present embodiment does not have the first dent 58 and the second dent 59, and a pair of projecting ribs 78*k* and 79*k* of the cap 7*k* does not have the space portions 789 and 799. In addition, the present embodiment is also the same as the second embodiment with regard to other elements. The same elements as the second embodiment are denoted by the same reference numerals, and the description is omitted.

In the second embodiment, as illustrated in FIG. 18, the first guide rib 48 projects toward the −X direction side from the adaptor first side wall 45*a* at the second intersection 428 at which the adaptor bottom wall 44*a* intersects the adaptor first side wall 45*a*. On the other hand, as illustrated in FIG. 19, a first guide rib 48*k* according to the present embodiment projects toward the −X direction side from the adaptor first side wall 45*a* further on the +Z direction side than the second intersection 428. In addition, in the second embodiment, as illustrated in FIG. 18, the second guide rib 49 projects toward the +X direction side from the adaptor second side wall 46*a* at the third intersection 438 at which the adaptor bottom wall 44*a* intersects the adaptor second side wall 46*a*. On the other hand, as illustrated in FIG. 19, a second guide rib 49*k* according to the present embodiment projects toward the +X direction side from the adaptor second side wall 46*a* further on the +Z direction side than the third intersection 438.

The first projecting rib 78*k* is formed at a position where the first guide rib 48*k* can be accommodated in a first recessed portion 708*k* when the cap 7*k* is attached to the cartridge 4*k* and in the attachment state. That is, when the first guide rib 48*k* of the present embodiment and the first guide rib 48 of the second embodiment illustrated in FIG. 18 are the same in dimension in the Z direction, the dimension in the Z direction of the first recessed portion 708*k* of the present embodiment is larger than the dimension in the Z direction of the first recessed portion 708 of the second embodiment. In addition, the second projecting rib 79*k* is formed at a position where the second guide rib 49*k* can be accommodated in a second recessed portion 709*k* when the cap 7*k* is attached to the cartridge 4*k* and in the attachment state. That is, when the second guide rib 49*k* of the present embodiment illustrated in FIG. 19 and the second guide rib 49 of the second embodiment illustrated in FIG. 18 are the same in dimension in the Z direction, the dimension in the Z direction of the second recessed portion 709*k* of the present embodiment is larger than the dimension in the Z direction of the second recessed portion 709 of the second embodiment. Even in such an aspect, when the cap 7*k* is attached to the cartridge 4*k* and in the attachment state, the cap 7*k* can accommodate the first guide rib 48*k* of the cartridge 4*k* in the first recessed portion 708*k* and can accommodate the second guide rib 49*k* in the second recessed portion 709*k*.

D. Other Embodiments

D-1: Another Embodiment 1

In the above-described embodiment, as illustrated in FIG. 17, the cartridge-side arrangement determination surface 57*s* is located further on the −Y direction side, which is a side opposite to the attachment direction DW, than is the first intersection 418 at which the adaptor bottom wall 44*a* intersects the adaptor rear wall 47*a*. In addition, the cap-side arrangement determination portion 770 is a cut-away portion that is cut away from the +Y direction side to the −Y direction side on the one end surface 77 of the sealing wall 74. However, the present disclosure is not limited thereto. The cartridge-side arrangement determination surface 57*s* may be located at the first intersection 418. When the cartridge-side arrangement determination surface 57*s* is located at the first intersection 418, for example, the one end surface 77 of the sealing wall 74 may be the cap-side arrangement determination surface 770*s*. As a result, the one end surface 77 as the cap-side arrangement determination surface 770*s* faces the cartridge-side arrangement determination surface 57*s*, whereby the movement of the cap 7 in the +Y direction with respect to the cartridge 4 can be regulated.

D-2. Another Embodiment 2

In the above-described embodiment, as illustrated in FIG. 7, in a state in which the cap 7 is disposed in the central portion C of the cartridge 4, the cap 7 is slid toward the first intersection 418 along the Y direction, whereby the cap 7 is attached to the cartridge 4. That is, the +Y direction is the attachment direction DW of the cap 7 with respect to the cartridge 4. However, the present disclosure is not limited thereto. The cap 7 may be slid from the first intersection 418 side to the central portion C side along the Y direction so as to be attached to the cartridge 4. That is, the −Y direction may be the attachment direction DW of the cap 7 with respect to the cartridge 4. When the −Y direction is the attachment direction DW of the cap 7 with respect to the cartridge 4, the cartridge-side arrangement determination portion 57 is formed, for example, on the central portion C side of the cartridge 4. At this time, the cap-side arrangement determination portion 770 is formed on the −Y direction side so as to face the cartridge-side arrangement determination portion 57 in the attachment state. In addition, when the cartridge-side arrangement determination portion 57 is formed on the central portion C side of the cartridge 4, the cartridge-side first regulating portion 52 and the cartridge-side second regulating portion 53 are each formed on the central portion C side of the cartridge 4. At this time, the cap-side first regulating portion 751 is formed on the −Y direction side so as to face the cartridge-side first regulating portion 52 in the attachment state. In addition, the cap-side second regulating portion 761 is formed on the −Y direction side so as to face the cartridge-side second regulating portion 53 in the attachment state. Even in such an aspect, in the attachment state, the cartridge-side arrangement determination portion 57 faces the cap-side arrangement determination portion 770, the cartridge-side first regulating portion 52 faces the cap-side first regulating portion 751, and the cartridge-side second regulating portion 53 faces the cap-side second regulating portion 761. As a result, the movement of the cap 7 in the Y direction extending along the attachment direction DW with respect to the cartridge 4 can be regulated.

E. Other Embodiments

The present disclosure is not limited to the above-described embodiment and can be implemented with various configurations without departing from the gist of the disclosure. For example, the technical features in the embodiments corresponding to the technical features in the respective aspects described in the summary of the disclosure can be appropriately replaced or combined in order to solve a part or all of the above-described problems or achieve a part or all of the above-described effects. In addition, the technical features may be appropriately deleted as long as the technical features are not described as essential features in this specification.

1. According to an aspect of the present disclosure, a cap is provided. The cap is configured to be attached to or detached from a cartridge having a liquid supply portion. When a Z direction is a direction that extends along the liquid supply portion, a Y direction is a longitudinal direction of the cap that intersects the Z direction, and an X direction is a lateral direction of the cap that intersects the Y direction and the Z direction, in an attachment state in which the cap is attached to the cartridge including a first guide rib and a second guide rib that extend in the Y direction and project outward in the X direction, the cap includes a sealing wall having a liquid holding portion that faces the liquid supply portion, a first projecting rib projecting in a direction opposite to a projecting direction of the first guide rib, a second projecting rib projecting in a direction opposite to a projecting direction of the second guide rib, a first recessed portion that is formed between the sealing wall and the first projecting rib and accommodates the first guide rib, and a second recessed portion that is formed between the sealing wall and the second projecting rib and accommodates the second guide rib. According to the aspect, when the cap is attached to the cartridge, and in an attachment state in which the cap is attached to the cartridge, the first guide rib can be accommodated in the first recessed portion, and at the same time, the second guide rib can be accommodated in the second recessed portion. As a result, in two directions of the X direction extending along the lateral direction of the cap and the Z direction intersecting the X direction and extending along the liquid supply portion, the movement of the cap with respect to the cartridge can be regulated. Therefore, even when the cartridge receives an external shock by falling or the like, the possibility of coming off of the cap attached to the cartridge from the cartridge can be reduced.

2. In the above-described aspect, the first projecting rib may have a first locking surface that faces a first regulating surface of the cartridge and regulates movement toward a −Z direction side, and a first top surface that faces a first side wall that forms a wall of the cartridge on a −X direction side, and the second projecting rib may have a second locking surface that faces a second regulating surface of the cartridge and regulates movement toward the −Z direction side, and a second top surface that faces a second side wall that forms a wall of the cartridge on a +X direction side. According to the aspect, when the cap is attached to the cartridge and in the attachment state, the first regulating surface and the first locking surface face each other, and the second regulating surface and the second locking surface face each other, whereby the movement of the cap in the −Z direction with respect to the cartridge can be regulated. As a result, the possibility of generating a gap between the liquid holding portion of the cap and the liquid supply portion of the cap can be reduced. Therefore, even when the liquid leaks from the liquid supply portion, the possibility of leakage of the liquid to the outside of the cap can be more reliably reduced.

3. In the above-described aspect, when a +Y direction is an attachment direction of the cap with respect to the cartridge, a cap-side regulating portion may be further included, and the cap-side regulating portion faces, in the attachment direction, a cartridge-side regulating portion provided on a +Y direction side of the cartridge to regulate movement in a direction opposite to the attachment direction. According to the aspect, when the cap is attached to the cartridge and in the attachment state, the cartridge-side regulating portion and the cap-side regulating portion face each other, whereby the movement of the cap in a direction opposite to the attachment direction with respect to the cartridge can be regulated. As a result, the positioning accuracy of the cap with respect to the cartridge can be improved. Therefore, in the attachment state, the liquid holding portion of the cap and the liquid supply portion of the cartridge can face each other more reliably, and even when the liquid leaks from the liquid supply portion, the possibility of leakage of the liquid to the outside of the cap can be more reliably reduced.

4. In the above-described aspect, a cap-side arrangement determination portion may be further included, and the cap-side arrangement determination portion faces, in the attachment direction, a cartridge-side arrangement determination portion provided on the +Y direction side of the cartridge and projecting outward in the Z direction to regulate movement in the attachment direction. According to the aspect, when the cap is attached to the cartridge and in the attachment state, the cartridge-side arrangement determination portion and the cap-side arrangement determination portion face each other, whereby the movement of the cap in the attachment direction with respect to the cartridge can be regulated. As a result, the positioning accuracy of the cap with respect to the cartridge can be further improved. Therefore, in the attachment state, the liquid holding portion of the cap and the liquid supply portion of the cartridge can face each other further reliably, and even when the liquid leaks from the liquid supply portion, the possibility of leakage of the liquid to the outside of the cap can be further reliably reduced.

5. In the above-described aspect, the first top surface may face a first bottom surface that is a bottom of a first dent, of the first side wall, recessed toward the +X direction side that is the same as a projecting direction of the first projecting rib, and the second top surface may face a second bottom surface that is a bottom of a second dent, of the second side wall, recessed toward the −X direction side that is the same as a projecting direction of the second projecting rib. According to the aspect, when the cap is attached to the cartridge and in the attachment state, at least a part of the first projecting rib is accommodated in the first dent, whereby the first top surface of the first projecting rib and the first bottom surface of the first dent face each other. In addition, when the cap is attached to the cartridge and in the attachment state, at least a part of the second projecting rib is accommodated in the second dent, whereby the second top surface of the second projecting rib and the second bottom surface of the second dent face each other. In addition, according to the aspect, while at least a part of the first projecting rib is accommodated in the first dent, and at least a part of the second projecting rib is accommodated in the second dent, the cap can be attached to the cartridge. Therefore, the cap can be more smoothly attached to the cartridge.

6. According to another aspect of the present disclosure, a cartridge unit is provided. The cartridge unit includes a cartridge having a liquid supply portion, and the cap described in the above-described aspect and attached to the cartridge. According to the aspect, when the cap is attached to the cartridge, and in an attachment state in which the cap is attached to the cartridge, the first guide rib can be accommodated in the first recessed portion, and at the same time, the second guide rib can be accommodated in the second recessed portion. As a result, in two directions of the X direction along the lateral direction of the cap and the Z direction intersecting the X direction and extending along the liquid supply portion, the movement of the cap with respect to the cartridge can be regulated. Therefore, even when the cartridge receives an external shock by falling or the like, the possibility of coming off of the cap attached to the cartridge from the cartridge can be reduced.

Not all of the plurality of elements of the respective aspects of the above-described present disclosure are essential. In order to resolve a part or all of the above-described problems or achieve a part or all of the effects described in the specification, some of the plurality of elements may be appropriately changed, deleted, or substituted with other new elements, and limitation contents may be also partially deleted. In order to solve a part or all of the above-described problems or achieve a part or all of the effects described in the specification, a part or all of the technical features included in one of the aspects of the above-described present disclosure may be combined with a part or all of the technical features included in the other one of the aspects of the above-described present disclosure to form an independent aspect of the present disclosure.

The present disclosure may be implemented in other various forms than the cap and the cartridge unit. For example, the present disclosure may be implemented in forms of a method of manufacturing the cap, a method of manufacturing the cartridge unit, and the like.

What is claimed is:

1. A cap configured to be attached to or detached from a cartridge having a liquid supply portion, the cap comprising:

when a Z direction is a direction that extends along the liquid supply portion, a Y direction is a longitudinal direction of the cap that intersects the Z direction, and an X direction is a lateral direction of the cap that intersects the Y direction and the Z direction, in an attachment state in which the cap is attached to the cartridge including a first guide rib and a second guide rib that extend in the Y direction and project outward in the X direction, a sealing wall having a liquid holding portion that faces the liquid supply portion;

a first projecting rib projecting in a direction opposite to a projecting direction of the first guide rib;

a second projecting rib projecting in a direction opposite to a projecting direction of the second guide rib;

a first recessed portion that is formed between the sealing wall and the first projecting rib and accommodates the first guide rib; and a second recessed portion that is formed between the sealing wall and the second projecting rib and accommodates the second guide rib, wherein the first projecting rib has a first locking surface that faces a first regulating surface of the cartridge and regulates movement toward a −Z direction side, and a first top surface that faces a first side wall that forms a wall of the cartridge on a −X direction side, the second projecting rib has a second locking surface that faces a second regulating surface of the cartridge and regulates movement toward the −Z direction side, and a second top surface that faces a second side wall that forms a wall of the cartridge on a +X direction side, the first top surface faces a first bottom surface that is a bottom of a first dent, of the first side wall, recessed toward the +X direction side that is same as a projecting direction of the first projecting rib, and the second top surface faces a second bottom surface that is a bottom of a second dent, of the second side wall, recessed toward the −X direction side that is same as a projecting direction of the second projecting rib.

2. The cap according to claim 1, further comprising when a +Y direction is an attachment direction of the cap with respect to the cartridge, a cap-side regulating portion that faces, in the attachment direction, a cartridge-side regulating portion provided on a +Y direction side of the cartridge to regulate movement in a direction opposite to the attachment direction.

3. The cap according to claim 2, further comprising a cap-side arrangement determination portion that faces, in the attachment direction, a cartridge-side arrangement determination portion provided on the +Y direction side of the cartridge and projecting outward in the Z direction to regulate movement in the attachment direction.

4. A cartridge unit comprising:

a cartridge having a liquid supply portion; and the cap according to claim 1 attached to the cartridge.

* * * * *